(12) United States Patent  (10) Patent No.: US 8,090,101 B2
Ye et al.  (45) Date of Patent: Jan. 3, 2012

(54) METHOD AND SYSTEM FOR GENERATING A SECRET KEY FROM JOINT RANDOMNESS

(75) Inventors: Chunxuan Ye, King of Prussia, PA (US);
Alexander Reznik, Titusville, NJ (US);
Yogendra Shah, Exton, PA (US);
Gregory S. Sternberg, Mt. Laurel, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1139 days.

(21) Appl. No.: 11/612,671

(22) Filed: Dec. 19, 2006

(65) Prior Publication Data

US 2007/0165845 A1 Jul. 19, 2007

Related U.S. Application Data

(60) Provisional application No. 60/751,803, filed on Dec. 20, 2005, provisional application No. 60/797,296, filed on May 3, 2006, provisional application No. 60/819,023, filed on Jul. 7, 2006.

(51) Int. Cl.
*H04L 9/00* (2006.01)
(52) U.S. Cl. .............................. 380/47; 380/44; 380/45
(58) Field of Classification Search .................... 380/44, 380/45, 47
See application file for complete search history.

(56) References Cited

U.S. PATENT DOCUMENTS

| 6,862,326 B1 | 3/2005 | Eran et al. |
| 2003/0114125 A1 | 6/2003 | Sourour et al. |
| 2004/0213363 A1 | 10/2004 | Bottomley et al. |
| 2005/0008157 A1 | 1/2005 | Hjelm |
| 2005/0036623 A1 | 2/2005 | Sheu et al. |
| 2007/0058808 A1* | 3/2007 | Rudolf et al. ................... 380/44 |
| 2008/0304658 A1* | 12/2008 | Yuda et al. ...................... 380/44 |

FOREIGN PATENT DOCUMENTS

| EP | 1 480 372 | 11/2004 |
| JP | 2001-326630 | 11/2001 |
| JP | 2004-032679 | 1/2004 |
| JP | 2005-130127 | 5/2005 |

(Continued)

OTHER PUBLICATIONS $3^{rd}$ Generation Partnership Project; Technical Specification Group Radio Access Network; User Equipment (UE) radio transmission and reception (FDD) (Release 7) 3GPP TS 25.101 V7.1.0 (Sep. 2005).

(Continued)

*Primary Examiner* — Brandon S Hoffman
*Assistant Examiner* — Michael Anderson
(74) *Attorney, Agent, or Firm* — Woodock Washburn LLP

(57) ABSTRACT

A method and system for generating a secret key from joint randomness shared by wireless transmit/receive units (WTRUs) are disclosed. A first WTRU and a second WTRU perform channel estimation to generate a sampled channel impulse response (CIR) on a channel between the first WTRU and the second WTRU. The first WTRU generates a set of bits from the sampled CIR and generates a secret key and a syndrome, (or parity bits), from the set of bits. The first WTRU sends the syndrome, (or parity bits), to the second WTRU. The second WTRU reconstructs the set of bits from the syndrome, (or parity bits), and its own sampled CIR, and generates the secret key from the reconstructed set of bits.

46 Claims, 19 Drawing Sheets

FOREIGN PATENT DOCUMENTS

| WO | 96/22643 | 7/1996 |
|---|---|---|
| WO | 01/59940 | 8/2001 |

OTHER PUBLICATIONS

A. Kraskov et al. "Estimating Mutual Information", Physical Review E. 69, 2004.

A.A. Hassan et al. "Cryptographic Key Agreement for Mobile Radio", IEEE Digital Signal Processing Magazine, vol. 6, pp. 207-212, 1996.

A.D. Liveris et al. "Compression of Binary Sources with Side Information at the Decoding Using LDPC Codes", IEEE Communication Letters, vol. 6, pp. 440-442, 2002.

Aono et al., "Wireless Secret Key Generation Exploiting Reactance-Domain Scalar Response of Multipath Fading Channels," IEEE Transactions on Antennas and Propagation, vol. 53, No. 11, pp. 3776-3784 (Nov. 2005).

C. H. Bennett et al. "Generalized Privacy Amplification", IEEE Transactions on Information Theory, IT-41: 1915-1923, 1995.

Chunxuan Ye et al. "Secret Key and Private Key Constructions for Simple Multiterminal Source Models", Proceedings International Symposium on Information Theory, pp. 2133-2137, 2005.

Chunxuan Ye et al. "The Private Key Capacity Region for Three Terminals", In Proceedings International Symposium on Information Theory, 2004.

Chunxuan Ye et al. "The Secret Key-Private Capacity Region for Three Terminals", In Proceedings International Symposium on Information Theory, pp. 2142-2146, 2005.

D. L. Donoho et al. "Optimally Sparse Representation in General (Nonorthogonal) Dictionaries via Minimization", Proc. Nat. Acad. Sci., vol. 100, No. 5, pp. 2197-2202, Mar. 2003.

D. L. Donoho et al. "Stable Recovery of Sparse Overcomplete Representations in the Presence of Noise", IEEE Transactions on Information Theory; vol. 52, No. 1, Jan. 2006; (Revised Sep. 2005).

D. L. Donoho et al. "Uncertainty Principles and Ideal Atomic Decomposition", IEEE Transactions on Information Theory, IT-47, pp. 2845-2862, 2001.

H. Koorapaty et al. "Secure Information Transmission for Mobile Radio", IEEE Communications Letters, vol. 4, pp. 52-55, 2000.

I. Csiszar et al. "Common Randomness and Secret Key Generation with a Helper", IEEE Transactions on Information Theory, IT-46:344-366, 2000.

I. Csiszar et al. "Secrecy Capabilities for Multiple Terminals", IEEE Transactions on Information Theory, IT-50: 3047-3061, 2004.

J. A. Tropp "Greed is Good: Algorithmic Results for Sparse Approximation", IEEE Transactions on Information Theory, IT-50, pp. 2231-2242, 2004.

J. Max "Quantizing for Minimum Distortion", IEEE Transactions on Information Theory, pp. 7-12, 1960.

J. P. Linnartz et al. "New Shielding Functions to Enhance Privacy and Prevent Misuse of Biometric Templates", In AVBPA Conference on Biometrics, 2003.

J. Ziv "The Behavior of Analog Communication Systems", IEEE Transactions on Information Theory, IT-16:587-594, 1970.

M. Burrows et al. "A Block-Sorting Lossless Data Compression Algorithm", Digital Systems Res. Ctr. Palo Alto, CA, Tech. Rep. SRC 124, 1994.

M. Elad et al. "A Generalized Uncertainty Principle and Sparse Representations in Pairs of Bases", IEEE Transactions on Information Theory, IT-48, pp. 2558-2567, 2002.

M. W. Marcellin et al. "Trellis Coded Quantization of Memoryless and Gauss-Markov Sources", IEEE Transactions on Communication, vol. 38, pp. 82-93, 1990.

Q. Wang et al. "Divergence Estimation of Continuous Distributions Based on Data-Dependent Partitions", IEEE Transactions on Information Theory, IT-51: 3064-3074, 2005.

R. Ahlswede and I. Csiszar, "Common Randomness in Information Theory and Cryptography—Part I: Secret Sharing", IEEE Transactions on Information Theory, IT-39:1121-1132, 1992.

R. Gribonval et al. "Sparse Representations in Union of Bases", IEEE Transactions on Information Theory, IT-49, pp. 3320-3325, 2003.

Shamai et al. "Systematic Lossy Source/Channel Coding", IEEE Transactions on Information Theory, vol. 44, No. 2, Mar. 1998.

T. J. Goblick "Theoretical Limitation on the Transmission of Data Form Analog Sources", IEEE Transactions on Information Theory, IT-11:558-567, 1965.

U. Maurer et al. "Information-Theoretic Key Agreement: From Weak to Strong Secrecy for Free", Advances in Cryptology—EUROCRYPT 2000, vol. 1807 of Lecture Notes in Computer Science, pp. 351-368, 2000.

U. Maurer et al. "Secret Key Agreement Over Unauthenticated Public Channels—Part I: Definitions and Bounds", IEEE Transactions on Information Theory, IT-49: 2003.

U. Maurer et al. Secret Key Agreement Over Unauthenticated Public Channels—Part II: The Simulatability Condition, IEEE Transactions on Information Theory, IT-49: 2003.

U. Maurer et al. Secret Key Agreement Over Unauthenticated Public Channels—Part III: Privacy Amplification, IEEE Transactions on Information Theory, IT-49: 2003.

U. Maurer et al. "Unconditionally Secure Key Agreement and the Intrinsic Conditional Information", IEEE Transactions on Information Theory, IT-45:499-514, 1999.

U. Maurer, "Secret Key Agreement by Public Discussion From Common Information", IEEE Transactions on Information Theory, IT-39:733-742, 1993.

Universal Mobile Telecommunications System (UMTS); User Equipment (UE) radio transmission and reception (FDD) (3GPP TS 25.101 version 5.11.0 Release 5, Jun. 2004).

Universal Mobile Telecommunications System (UMTS); User Equipment (UE) radio transmission and reception (FDD) (3GPP TS 25.101 version 7.5.0 Release 7) ETSI TS 125 101 V7.5.0 (Oct. 2006).

Ye, Chunxuan et al. "Extracting Secrecy from Jointly Gaussian Random Variables", 2006.

Z. Xiong et al. "Distributed Source Coding for Sensor Networks", IEEE Signal Processing Mag., 2004.

R. Ahlswede and I. Csiszar, "Common Randomness in Information Theory and Cryptography—Part I: Secret Sharing", IEEE Transactions on Information Theory, IT-39:1121-1132, 1992.

U. Maurer, "Secret Key Agreement by Public Discussion From Common Information", IEEE Transactions on Information Theory, IT-39:733-742, 1993.

Ye, Chunxuan et al. "Extracting Secrecy from Jointly Gaussian Random Variables", 2006.

Universal Mobile Telecommunications System (UMTS); User Equipment (UE) radio transmission and reception (FDD) (3GPP TS 25.101 version 5.11.0 Release 5, Jun. 2004).

Q. Wang et al. "Divergence Estimation of Continuous Distributions Based on Data-Dependent Partitions", IEEE Transactions on Information Theory, IT-51: 3064-3074, 2005.

Horiiket et al., "A Scheme of Secret Key Agreement Based on the Random Fluctuation of Channel Characteristics in Land Mobile Radio", The Institute of Electronics, Information and Communication Engineers, Oct. 2002, 8 pages.

Kitaura et al., "A Scheme of Secret Key Agreement Based on the Change of Received Signal Strength by Antenna Switching in Land Mobile Radio", The Institute of Electronics, Information and Communication Engineers, Jan. 2005, 8 pages.

Ye et al., "On the Secrecy Capabilities of ITU Channels", IEEE-Xplore-Vehicular Technology Conference, IEEE 66th Edition, Sep. 30, 2007-Oct. 3, 2007, 8 pages.

* cited by examiner

METHOD AND SYSTEM FOR GENERATING A SECRET KEY FROM JOINT RANDOMNESS

CROSS REFERENCE TO RELATED APPLICATIONS

This application claims the benefit of U.S. Provisional Application Nos. 60/751,803 filed Dec. 20, 2005, 60/797,296 filed May 3, 2006 and 60/819,023 filed Jul. 7, 2006, which are incorporated by reference as if fully set forth.

FIELD OF INVENTION

The present invention is related to wireless communication systems. More particularly, the present invention is related to a method and system for generating a secret key from joint randomness shared by wireless transmit/receive units (WTRUs).

BACKGROUND

Suppose that two terminals, used by User A and User B, communicate with each other on the same frequency in a wireless environment. These two terminals are able to apply training sequences in their transmissions to estimate a channel impulse response (CIR) of their reciprocal wireless channel. A wireless channel is modeled by a collection of discrete pulses with different scales and delays. Each pulse represents a single-path fading channel, preferably Rayleigh or Rician fading. Mathematically, the wireless channel is modeled as follows:

$$a(t) = \sum_{l=1}^{L} \alpha_l \delta(t - \tau_l), \qquad \text{Equation (1)}$$

where $L \in [1, +\infty)$ and $\alpha_l$, $\tau_l$ represent amplitude and delay of the $l^{th}$ path in the wireless L-path fading channel. In the Rayleigh fading channel, the amplitudes $\alpha_1, \ldots, \alpha_L$ are zero-mean complex Gaussian random variables.

The CIR of a wireless channel can be written as follows:

$$h(t) = p(t) * a(t), \qquad \text{Equation (2)}$$

where $p(t)$ is the "pulse shape" resulting from the pre-determined band-limited transmitter and receiver filters. By putting Equation (1) into Equation (2), $$h(t) = \sum_{l=1}^{L} \alpha_l p(t - \tau_l), \qquad \text{Equation (3)}$$

which implies that the CIR is the superimposition of multiple delayed and scaled copies of the pulse shape $p(t)$.

User A and User B respectively observe a sampled noisy version of the CIR $h(t)$. Their observations may be written as follows:

$$h_A[n] = C_A h(nT_S - \tau_A) + Z_A[nT_S], \text{and} \qquad \text{Equation (4)}$$

$$h_B[n] = C_B h(nT_S - \tau_B) + Z_B[nT_S], \qquad \text{Equation (5)}$$

where $T_S$ is the sample interval, which is assumed to be the same at both terminals and $\tau_A$ and $\tau_B$ are the sampling time offsets associated with each receiver. The sample interval $T_S$ should be large enough (at least larger than the coherence time interval) to guarantee the independence of two successive observations.

Hence, the sampling time difference between the two terminals is $|\tau_A - \tau_B|$. Values $C_A$ and $C_B$ are complex constants, reflecting different amplification and phase offset associated with each receiver. It is assumed that $C_A = C_B = 1$ for simplicity. Values $Z_A[nT_S]$ and $Z_B[nT_S]$ are independent additive Gaussian noise sequences.

Since User A and User B's observations $h_A[n]$ and $h_B[n]$ are based on their reciprocal wireless channel, $h(t)$, they are correlated with each other. On the other hand, a third terminal, used by User C and located in a geographically different place from User A and User B more than a wavelength away, possesses no relevant information on the channel.

Based on their correlated channel observations, User A and User B wish to generate a common secret key. In generating such a secret key, they can communicate over an error-free authenticated wireless channel. The generated secret key should be concealed from a potential eavesdropper, who may observe the transmissions on the public channel. In particular, the generated secret key is required to be nearly "statistically independent" of the public transmissions.

Let $X^n = (X_1, \ldots, X_n)$ and $Y^n = (Y_1, \ldots, Y_n)$ be n independent and identically distributed repetitions of the correlated random variables X and Y. User A and User B respectively observe the sequences $X^n$ and $Y^n$. Furthermore, User A and User B can communicate with each other over an error-free wireless channel, possibly interactively in many rounds. Let V denote all the transmissions on the wireless channel. After the transmissions, User A generates a bit string $S_A$, based on $(X^n, V)$, and User B generates a bit string $S_B$, based on $(Y^n, V)$. A bit string S constitutes a secret key if the following conditions are satisfied.

$$Pr(S = S_A = S_B) \approx 1; \qquad \text{Equation (6)}$$

$$I(S;V) \approx 0; \text{ and} \qquad \text{Equation (7)}$$

$$H(S) \approx |S|, \qquad \text{Equation (8)}$$

where $|S|$ denotes the length of the bit string S, $I(S;V)$ denotes the mutual information between S and V, and $H(S)$ denotes the entropy of S. The first condition above means that User A and User B generate almost the same secret key, the second condition means that this secret key is nearly statistically independent of User C's information, (i.e., the transmissions V on the wireless channel), and the third condition means that this secret key is nearly uniformly distributed. Hence, this secret key is effectively concealed from User C. Here, the eavesdropper, User C, is passive, (i.e., unable to tamper with the transmissions V on the public channel).

The (entropy) rate of a secret key, $H(S)/n$, is called a secret key rate. The largest secret key rate is called the secret key capacity, denoted by $C_S$. The concept of secret key capacity indicates the length of the longest secret key that can be generated by User A and User B, based on their observations $X^n$ and $Y^n$. The secret key capacity for the model above is as follows:

$$C_S = I(X;Y). \qquad \text{Equation (9)}$$

It is known that in certain scenarios, such as those described here, the secret key capacity can be achieved by a single transmission from User A to User B, or vice versa.

Suppose that the wireless channel between User A and User B is an L-path fading channel with average path power $(p_1, \ldots, p_L)$. Suppose that the average power of the additive white Gaussian noise (AWGN) on the wireless channel is N. Hence, the mutual information between User A and User B's CIR observations on the $l^{th}$ path is given by:

$$I_l = \log\left(1 + \frac{\frac{p_l}{N}}{2 + \frac{N}{p_l}}\right).$$ Equation (10)

By the union bound, the mutual information between User A and User B's overall CIR observations is upper bounded by $$\sum_{l=1}^{L} I_l.$$

This is actually the upper bound on the secret key rate that can be achieved by User A and User B.

When the first path in an L-path fading channel is set as a reference path, the relative average path power of this channel can be written as $(\overline{p}_1, \ldots, \overline{p}_L)$, with $$\overline{p}_l = \frac{p_l}{p_1}.$$

Then, the secret key rate is upper bounded by:

$$\sum_{l=1}^{L} \log\left(1 + \frac{SNR \cdot \overline{p}_l}{2 + \frac{1}{SNR \cdot \overline{p}_l}}\right),$$ Equation (11)

where the $$SNR = \frac{p_1}{N}$$

is defined for the reference path.

For uses in cryptographic applications, it is desirable to generate full entropy strings (independent bits with Pr(0)=Pr(1)=½). Therefore, it is desirable to remove the correlation among the samples. For a single-path channel, this can be done by simply selecting one sample, (e.g., the one with the largest value), from all the samples. However, for multipath channels, just several samples, (one sample per path), cannot be selected from all the samples, as those selected samples will be correlated with each other. Hence, how to remove the correlation among samples is a significant challenge.

Another practical problem comes from the sampling time difference at two terminals. Sampling the same CIR with different sampling time offsets may lead to totally uncorrelated samples. This problem can be lessened with increased sampling rate. However, increasing the sampling rate has a disadvantage of generating highly redundant samples. Therefore, instead of merely increasing the sampling rate, it would be desirable to align the sampling time at both terminals, which may involve the estimation of the sampling time difference. Other practical problems include an SNR difference at two terminals and DC offsets, (i.e., non-zero mean random variables).

SUMMARY

The present invention is related to a method and system for generating a secret key from joint randomness shared by WTRUs. A first WTRU and a second WTRU perform channel estimation to generate a sampled CIR on a channel between the first WTRU and the second WTRU. The first WTRU generates a set of bits from the sampled CIR and generates a secret key and a syndrome, (or parity bits), from the set of bits. The first WTRU sends the syndrome, (or parity bits), to the second WTRU. The second WTRU reconstructs the set of bits from the syndrome, (or parity bits), and its own sampled CIR, and generates the secret key from the reconstructed set of bits. It is also possible that each WTRU generates a set of bits from partial of its sampled CIR and generates syndrome from the set of bits. Each WTRU sends the syndrome, and reconstructs the set of bits of the other WTRU generated from the syndrome and its own sampled CIR. Both WTRUs generate the secret key from the reconstructed set of bits and its own generated set of bits.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, a cellular telephone, a notebook computer, a personal data assistance (PDA), a Node-B, a base station, a site controller, an access point (AP) or any other type of device capable of operating in a wireless environment.

The features of the present invention may be incorporated into an integrated circuit (IC) or be configured in a circuit comprising a multitude of interconnecting components.

The present invention will be explained with reference to multi-path Rayleigh channels and provides a mathematical model for the Rayleigh fading channel only. However, it should be noted that reference to the Rayleigh channels is only for illustration purposes and the present invention is applicable to single-path or multipath channels based on any mathematical models.

The model for the analysis in the present invention is as follows: three mutually independent complex Gaussian random variables H, $Z_A$ and $Z_B$ are generated. H is generated according to $N(0, P)$, $Z_A$ is generated according to $N(0, N_A)$, and $Z_B$ is generated according to $N(0, N_B)$. Let $X = H + Z_A$ and $Y = H + Z_B$. A simple calculation shows that:

$$I(X;Y) = \log_2\left(1 + \frac{P}{N_A + N_B + \frac{N_A N_B}{P}}\right) \quad \text{Equation (12)}$$

Equations (11) can be rewritten as follows:

$$C_S = \log_2\left(1 + \frac{P}{N_A + N_B + \frac{N_A N_B}{P}}\right), \quad \text{Equation (13)}$$

which implies that based on the respective observations of the jointly Gaussian random variables $X''$ and $Y''$, two communicating WTRUs can generate a secret key with length no more than $$n\log_2\left(1 + \frac{P}{N_A + N_B + \frac{N_A N_B}{P}}\right)$$

bits.

For simplicity, it is assumed that $N_A = N_B = N$, and the SNR is defined as P/N. Then, Equation (13) is reduced to:

$$C_S = \log_2\left(1 + \frac{SNR}{2 + \frac{1}{SNR}}\right). \quad \text{Equation (14)}$$

Figure 1:
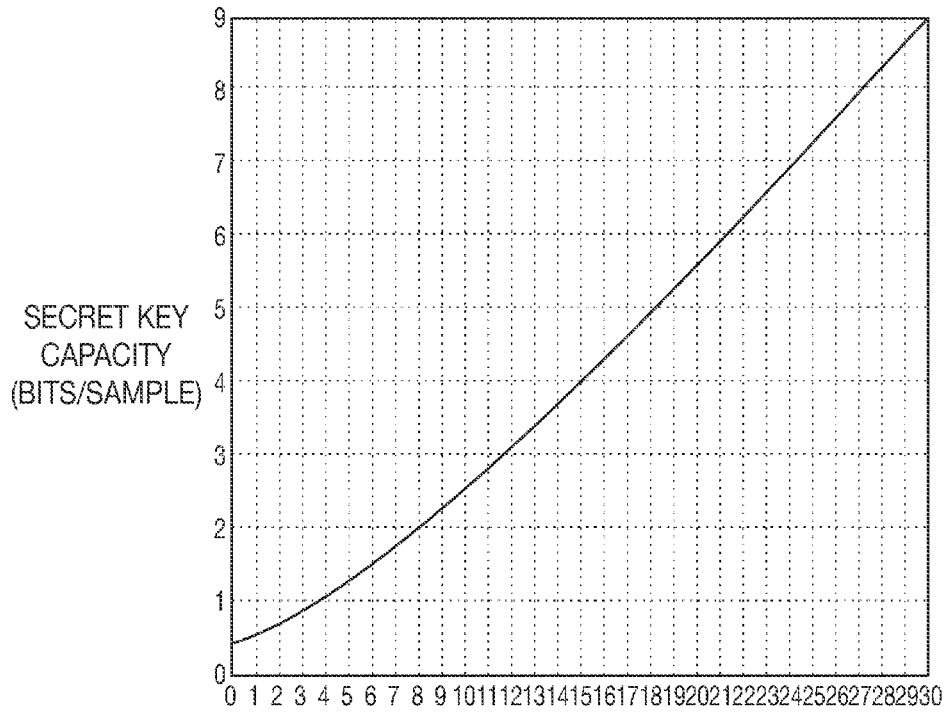
FIG. 1 shows a secret key capacity curve for a single-path Rayleigh fading channel.

A plot of the secret key capacity $C_s$ vs. SNR is shown in FIG. 1.

The jointly Gaussian random variables X and Y can be written as $$X = \frac{P}{P+N}Y + Z_0, \quad \text{Equation (15)}$$

$$\text{where } Z_0 \sim N\left(0, \frac{2PN + N^2}{P+N}\right)$$

is independent of Y.

Figure 2:
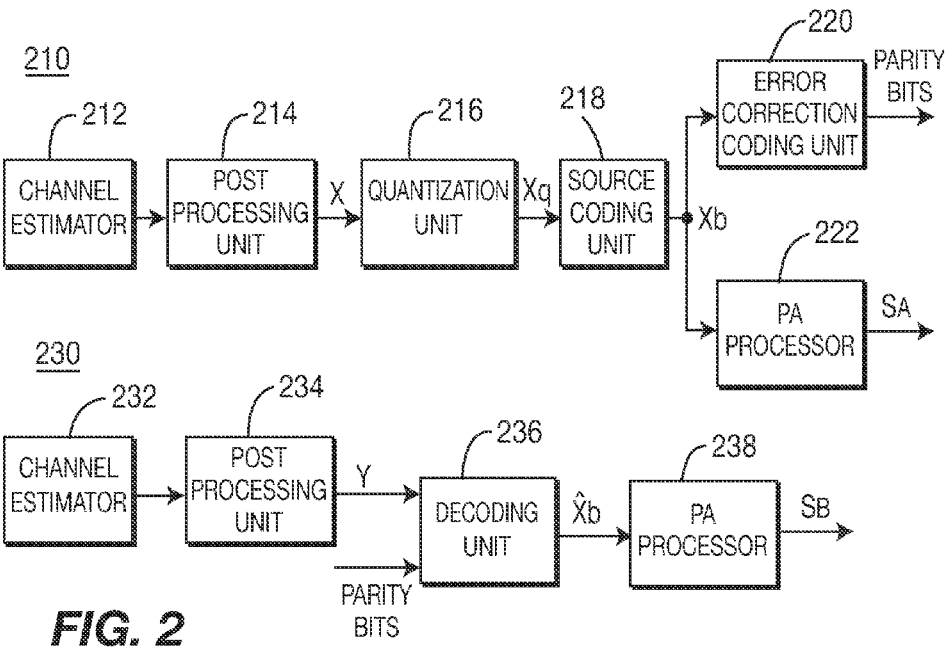
FIG. 2 is a block diagram of a system including two WTRUs configured in accordance with the present invention.

FIG. 2 is a block diagram of a system including two WTRUs 210, 230 configured in accordance with the present invention. A first WTRU 210 includes a channel estimator 212, a post processing unit 214 (optional), a quantization unit 216, a source coding unit 218, an error correction coding unit 220 and a privacy amplification (PA) processor 222. The channel estimator 212 generates sampled CIR on the wireless channel between the first WTRU 210 and the second WTRU 230. The sampled CIR may be processed by the post processing unit 214. The first WTRU 210 obtains the Gaussian random variable X through CIR measurement of the wireless channel and generates a secret key $S_A$ from the Gaussian random variable X.

As a secret key may be thought of as a bit string, or alternatively a symbol string, (hereinafter only "bit string" will be referred), the continuous random variable X is converted to a bit string $X_b$, which involves the processes of quantization and source coding. The random variable X is input into the quantization unit 216, which outputs quantized values $X_q$. The quantized values $X_q$ are coded into a bit string $X_b$ by the source coding unit 218.

The bit string $X_b$ is input into the error correction coding unit 220 and the PA processor 222. The error correction coding unit 220 performs error correction coding, (e.g., non-systematic or systematic block coding), on the bit string $X_b$ and generates syndrome, or parity bits, (hereinafter "syndrome" collectively). The error correction coding is known to the first WTRU 210 and the second WTRU 230 and possibly to any other WTRU as well. The PA processor 222 generates a secret key $S_A$ from the bit string $X_b$. The first WTRU 210 helps the second WTRU 230 reconstruct the bit string $X_b$ by transmitting the syndrome of $X_b$, (with respect to the given error correction code), to the second WTRU 230 over a wireless channel.

The second WTRU 230 includes a channel estimator 232, a post processing unit 234 (optional), a decoding unit 236 and a PA processor 238. The channel estimator 232 generates sampled CIR on the wireless channel between the first WTRU 210 and the second WTRU 230. The sampled CIR may be processed by the post processing unit 234. The second WTRU 230 obtains the joint Gaussian random variable Y through CIR measurement of the wireless channel and reconstructs $X_b$, (i.e., the bit string estimate $\hat{X}_b$), based on the syndrome received from the first WTRU 210 and its own observation Y. The joint Gaussian random variable Y and the syndrome enter into the decoding unit 236 to construct the bit string estimate $\hat{X}_b$. The PA processor 238 then generates the secret key $S_B$, (which is supposed to be same to $S_A$), from the bit string estimate $\hat{X}_b$. The eavesdropper, without the knowledge of Y, cannot fully reconstruct $X_b$.

The secret key is extracted by the first WTRU 210 and the second WTRU 230 from the bit string $X_b$ such that the secret key is nearly "statistically independent" of User C's information, (i.e., the syndrome of $X_b$). The privacy amplification may be achieved by using a universal hash function. If the bit string $X_b$ is a maximum-entropy bit string, (i.e., perfectly random), with the technique of syndrome-based encoding and decoding, the PA process is trivial as no hash is needed.

Details of the quantization unit 216, the source coding unit 218, the decoding unit 236 and the post processing units 214, 234 are explained in detail hereinafter.

With respect to the quantization unit 216, a quantization scheme is specified by a partition and its corresponding quanta. A partition consists of a set of disjoint intervals $S_1 \ldots S_\nu$, which cover the whole sample range. Quanta consist of a set of numbers $q_1 \ldots q_\nu$, where $q_i \in S_i$, which can be interpreted as quantized values. The quantization level for a partition $\{S_1 \ldots S_\nu\}$ is defined as $\log_2 \nu$. For a Rayleigh channel, as an example, two quantization schemes, equiprobable quantization and minimum mean squared error (MMSE) quantization, are considered, although other schemes may be applicable.

For equiprobable quantization, the partition $\{S_1 \ldots S_\nu\}$ for a random sample X, is defined so that:

$$Pr(X \in S_i) = \frac{1}{\nu}, 1 \le i \le \nu. \quad \text{Equation (16)}$$

Let $\hat{q}_i$ denote the right endpoint of interval $S_i$, $1 \le i \le \nu$. If the left endpoint of interval $S_i$ is identical to the right endpoint of interval $S_{i-1}$, a partition $\{S_1 \ldots S_\nu\}$ is actually specified by $\{\hat{q}_i, 1 \le i \le \nu\}$. According to equiprobable quantization, the value of $\hat{q}_i$, $1 \le i \le \nu$, is determined by the following:

$$\int_{-\infty}^{\hat{q}_i} f(x)dx = \frac{i}{\nu}, \quad \text{Equation (17)}$$

where $f(x)$ is the probability distribution of a random sample X.

For instance, the partition of a level-2 equiprobable quantizer for zero-mean, unit-variance Gaussian distribution is:

$$S1=(-\infty,-0.6745],S2=(-0.6745,0],S3=(0,0.6745],S4=(0.6745,\infty).$$

On the other hand, with MMSE quantization, the choice of a partition $\{S_1 \ldots S_\nu\}$ and quanta $\{q_1 \ldots q_\nu\}$ is one that minimizes the expected value $E[(X-q_x)^2]$, where X is a random sample and $q_x$ is the quantized value for X. Let $\hat{q}_i$ denote the right endpoint of interval $S_i$, $1 \le i \le \nu$. The values of $\hat{q}_i$ and $q_i$, which minimize $E[(X-q_x)^2]$, are calculated as follows:

$$\hat{q}_i = \frac{q_i + q_{i+1}}{2}, 1 \le i \le \nu - 1; \quad \text{Equation (18)}$$

$$\int_{\hat{q}_{i-1}}^{\hat{q}_i} (x-q_i)f(x)dx = 0, 1 \le i \le \nu, \quad \text{Equation (19)}$$

where $\hat{q}_0$ stands for the smallest possible sample value, which is $-\infty$ in our case.

For instance, the partition of a level-2 MMSE quantizer for zero-mean, unit-variance Gaussian distribution is:

$$S_1=(-\infty,-0.9816],S_2=(-0.9816,0],S_3=(0,0.9816],S_4=(0.9816,\infty),$$

and the corresponding quanta are $q_1=-1.51$, $q_2=-0.4528$, $q_3=0.4528$, $q_4=1.51$.

A key advantage of equiprobable quantization is that the output bits are by construction equiprobable, resulting in a maximum-entropy bit string. Any other quantization technique suffers from entropy loss. The entropy loss for MMSE quantizer is shown in Table 1. The secret key rate computations in accordance with the present invention may compensate for the entropy loss when using a non-equiprobable quantization scheme.

TABLE 1

| Quantization level (# bits per sample) | Informational entropy loss (# bits per sample) |
| --- | --- |
| 1 | 0 |
| 2 | 0.086 |
| 3 | 0.239 |
| 4 | 0.398 |
| 5 | 0.551 |

With respect to the source coding unit 218, the purpose of source coding is to convert an integer to a bit string. Preferably, the source coding scheme is natural coding or Gray coding. Natural coding is a natural representation of integers in the form of bit strings. For instance, in natural code of length 2, the codewords represents integers, 0, 1, 2 and 3, are "00", "01", "10", and "11", respectively.

Gray coding represents integers in the form of bit strings such that any two adjacent codewords differ in one bit. For instance, in Gray code of length 2, the codewords representing integers 0, 1, 2 and 3, are "00", "01,", "11" and "10", respectively.

Figure 3:
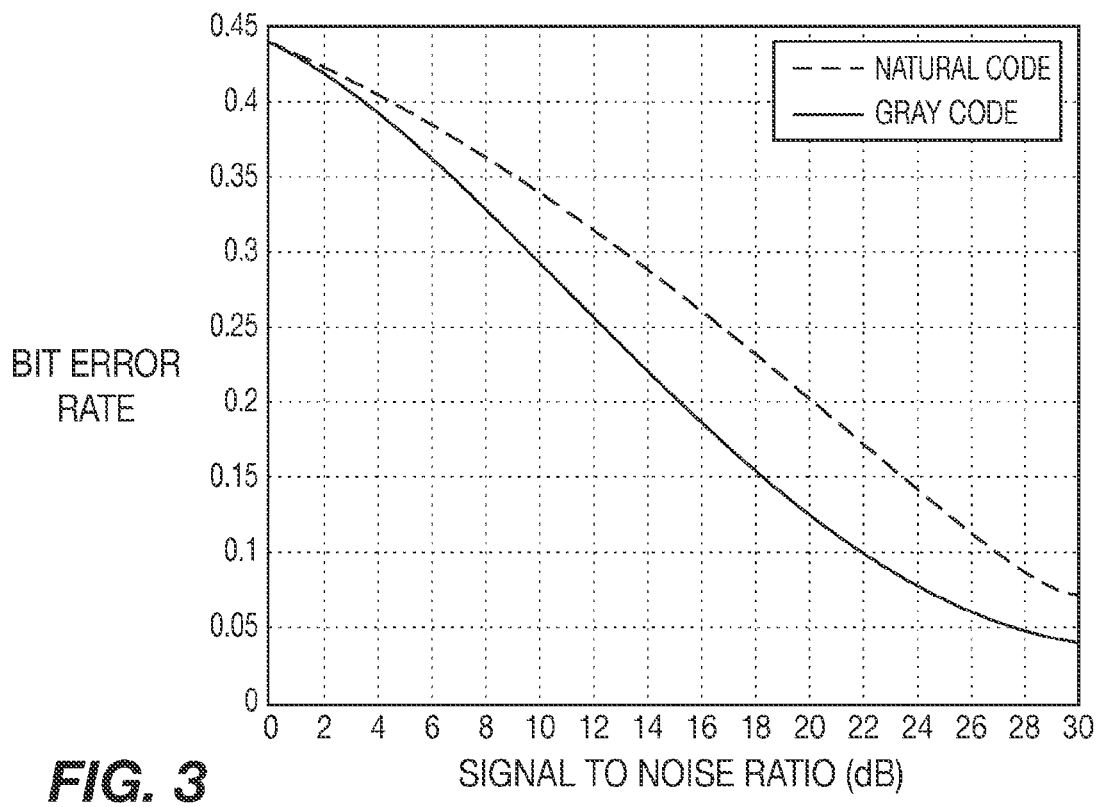
FIG. 3 shows simulation results for comparing the performance of natural code and Gray code in terms of a bit error rate (BER).

FIG. 3 shows simulation results for comparing the performance of natural code in terms of bit error rate (BER). In the simulation, the level-4 equiprobable quantization is applied. In the simulation results, Gray code outperforms natural code in the sense that by using Gray code, the WTRUs may generate bit strings with more common bits even though the actual values between the WTRUs may not be exactly the same. For a single level error, only one bit will differ.

Other coding schemes may be used which minimizes the number of bits which change between successive values. Ideally, the number of bits which change should grow as the difference between two values grows.

Figure 4:
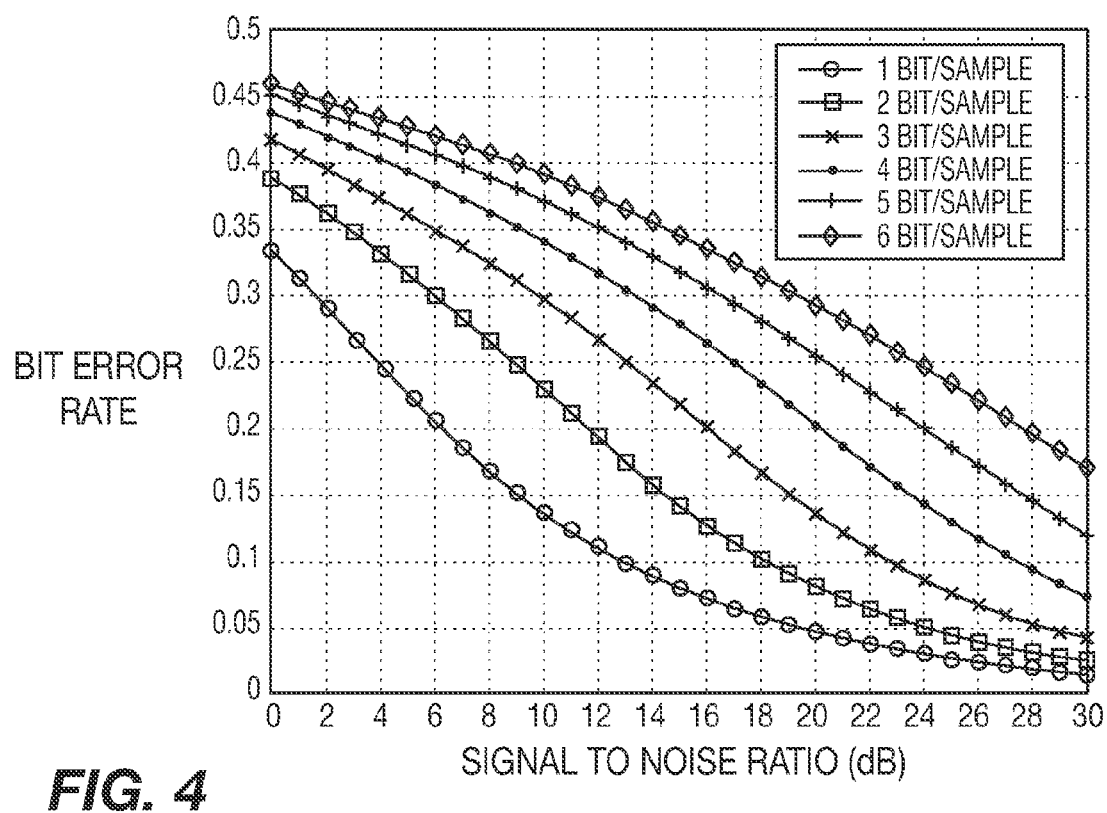
FIGS. 4 and 5 show simulation results for comparing the performance of different quantization levels in terms of BER while using natural code and Gray code, respectively.
Figure 5:
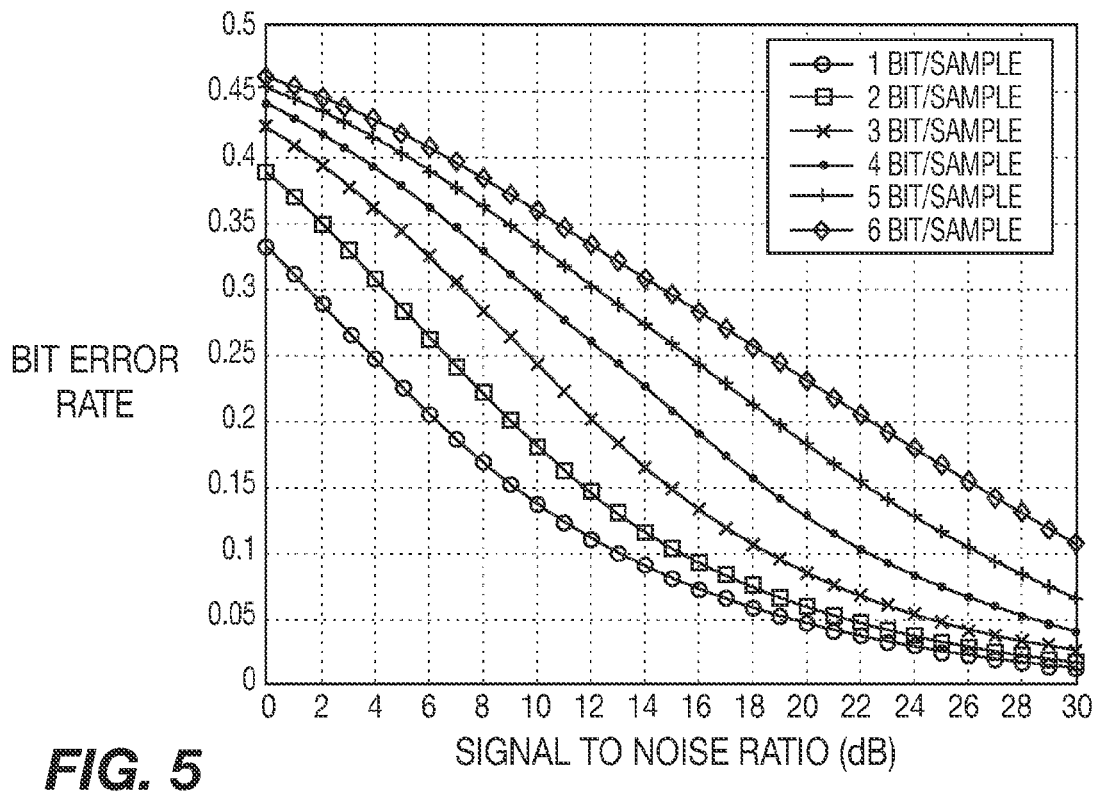

FIGS. 4 and 5 show simulation results for comparing the performance of different quantization levels in terms of BER while using natural code and Gray code, respective. Different quantization levels will result in different BERs. In accordance with the simulation results, the lower the quantization level, the smaller the BER. This is because a lower quantization level corresponds to larger intervals in the partition and the probability that two samples fall into the same interval increases. However, the use of a low-level quantization produces short bit strings. Therefore, there is a tradeoff between the length of output bit strings and the correlation between two output bit strings.

Figure 6:
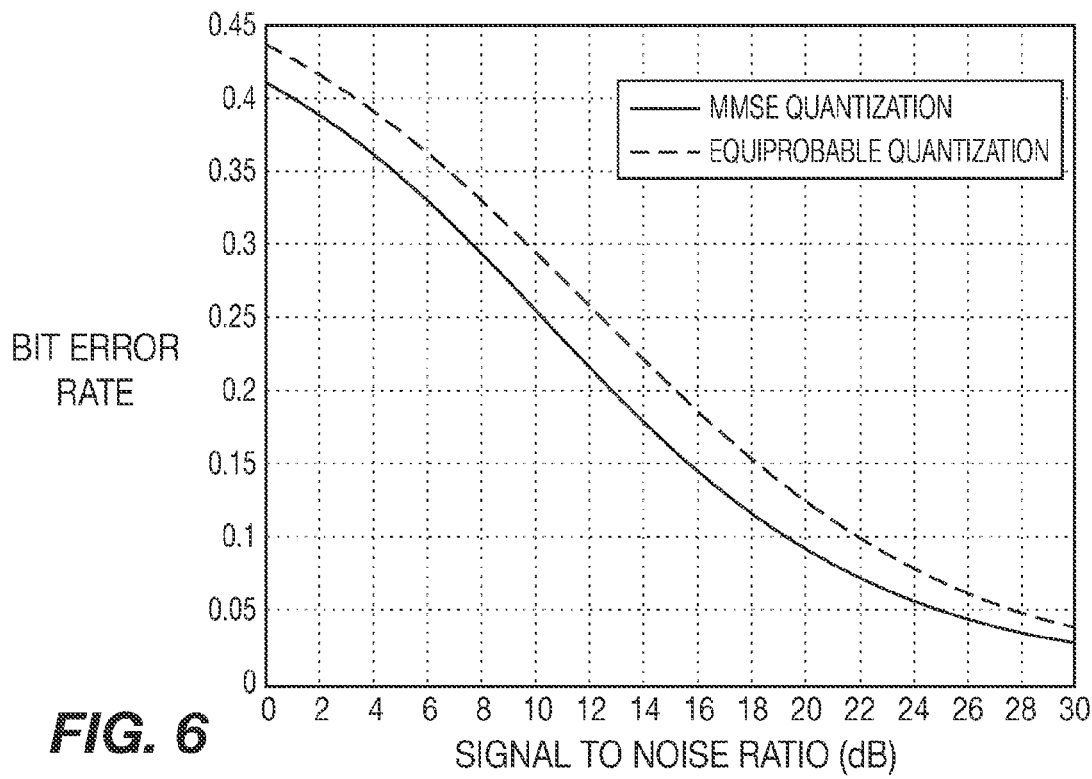
FIG. 6 shows simulation results for comparing the performance of equiprobable quantization and minimum mean square error (MMSE) quantization in terms of BER.

FIG. 6 shows simulation results for comparing the performance of equiprobable quantization and MMSE quantization in terms of BER. The bit string generated by using MMSE quantization is not uniformly distributed, which is undesirable since the secret key extracted from this bit string should be uniformly distributed. Therefore, this bit string should be compressed to be uniform, which leads to a short bit string. After compensating for entropy loss of MMSE quantization, the secret key rates generated from MMSE quantization and from equiprobable quantization are within a few tenths of a bit per sample. Table 2 summarizes the performance comparison between equiprobable quantization and MMSE quantization.

TABLE 2

| SNR (dB) | Secret key rate by using equiprobable quantization (bits/sample) | Secret key rate by using MMSE quantization (bits/sample) |
| --- | --- | --- |
| 13 | 2.27 | 2.72 |
| 15 | 3.03 | 3.28 |
| 17 | 3.66 | 3.84 |
| 19 | 4.30 | 4.45 |

The error correction coding unit 220 and the decoding unit 218 may, for example, implement a binary low density parity check (LDPC) coding, Reed-Solomon coding, Turbo coding, differential coding, or any other coding scheme. With respect to the decoding unit 218, the received syndrome (or parity bits) and the variable Y enter the decoding unit 218 and the decoding unit 218 reconstructs the bit string $X_b$. The decoding unit 236 computes a per-bit log likelihood ratio (LLR). The LLR may be computed by using hard decision or soft decision.

In the Rayleigh channel example, when using hard decision, the second WTRU 230 converts each of its CIR observation to bits $Y_b = (Y_{b,1}, \ldots Y_{b,\log_2 v})$, in the same manner as the conversion made by the first WTRU 210. The LLR for $X_{b,i}$ is then given by:

$$\ln\frac{Pr(X_{b,i}=0|Y_{b,i})}{Pr(X_{b,i}=1|Y_{b,i})} = \begin{cases} \ln\frac{1-p_i}{p_i}, & Y_{b,i}=0; \\ \ln\frac{p_i}{1-p_i}, & Y_{b,i}=1, \end{cases} \quad \text{Equation (20)}$$

where $p_i$ is the probability that $X_{b,i}$ differs from $Y_{b,i}$. Each curve in FIGS. 5 and 6 corresponds to $$\frac{1}{\log_2 v} \sum_{i=1}^{\log_2 v} p_i.$$

Similarly, in the Rayleigh channel example, when using soft decision, the second WTRU 230 calculates the LLR directly from Y, rather than $Y_b$. Suppose that the first WTRU 210 applies level-1 equiprobable quantization to convert its sample X to a single bit $X_{b,1}$ as follows:

$$X_{b,1} = \begin{cases} 0, & X \le 0; \\ 1, & X > 0. \end{cases} \quad \text{Equation (21)}$$

Then, $$Pr(X_{b,1}=0|Y) = Pr(X \le 0|Y) \quad \text{Equation (22)}$$
$$= Pr\left(\frac{P}{P+N}Y + Z_0 \le 0|Y\right),$$

$Z_0 \sim N\left(0, \frac{2PN+N^2}{P+N}\right)$ is independent of Y. Thus, $$Pr(X_{b,1}=0|Y) = Pr\left(Z_0 \le -\frac{P}{P+N}Y\right) \quad \text{Equation (23)}$$
$$= 1 - Q\left(-\frac{\frac{P}{P+N}Y}{\sqrt{(2PN+N^2)/(P+N)}}\right)$$

where                                                        Equation (24)

$$Q(x) = \frac{1}{\sqrt{2\pi}} \int_x^\infty e^{-\frac{t^2}{2}} dt.$$

Hence, the LLR for $X_{b,1}$ is given by:

$$\ln\frac{Pr(X_{b,1}=0|Y)}{Pr(X_{b,1}=1|Y)} = \ln\frac{Pr(X_{b,1}=0|Y)}{1-Pr(X_{b,1}=0|Y)} \quad \text{Equation (25)}$$
$$= \ln\frac{1-Q\left(-\frac{\frac{P}{P+N}Y}{\sqrt{(2PN+N^2)/(P+N)}}\right)}{Q\left(-\frac{\frac{P}{P+N}Y}{\sqrt{(2PN+N^2)/(P+N)}}\right)}.$$

The soft decision LLR depends on which source code is used in the bit conversion. Natural code and Gray code may result in different LLRs. Suppose that the first WTRU 210 applies a level-2 equiprobable quantization and natural coding to convert its sample X to two bits $(X_{b,1}, X_{b,2})$. The power of X is P+N. Hence, $X_{b,1}$ and $X_{b,2}$ are given by:

$$(X_{b,1}, X_{b,2}) = \begin{cases} 00, & X \le \sqrt{P+N} \cdot \bar{q}_1; \\ 01, & \sqrt{P+N} \cdot \bar{q}_1 < X \le \sqrt{P+N} \cdot \bar{q}_2; \\ 10, & \sqrt{P+N} \cdot \bar{q}_2 < X \le \sqrt{P+N} \cdot \bar{q}_3; \\ 11, & X > \sqrt{P+N} \cdot \bar{q}_3, \end{cases} \quad \text{Equation (26)}$$

where $\bar{q}_1 = -0.6745$, $\bar{q}_2 = 0$ and $\bar{q}_3 = 0.6745$ are the quantization boundaries for zero-mean, unit-variance Gaussian distribution. In other words, $\bar{q}_i$ is determined by:

$$\int_{-\infty}^{\bar{q}_i} \frac{1}{\sqrt{2\pi}} e^{-\frac{x^2}{2}} dx = \frac{i}{v}.$$ Equation (27)

The LLR for the first bit $X_{b,1}$ is given by Equation (25). The LLR for the second bit $X_{b,2}$ is calculated as follows:

$$Pr(X_{b,2} = 0|Y) = Pr(X \le \sqrt{P+N} \cdot \bar{q}_1 \text{ or } \sqrt{P+N} \cdot$$ Equation (28)

$$\bar{q}_2 < X \le \sqrt{P+N} \cdot \bar{q}_3 | Y)$$

$$= Pr\left(\frac{P}{P+N}Y + Z_0 \le \sqrt{P+N} \cdot \right.$$

$$\bar{q}_1 | Y) + Pr\left(\sqrt{P+N} \cdot \bar{q}_2 < \right.$$

$$\left.\frac{P}{P+N}Y + Z_0 \le \sqrt{P+N} \cdot \bar{q}_3 | Y\right)$$

$$= Pr\left(Z_0 \le \sqrt{P+N} \cdot \bar{q}_1 - \frac{P}{P+N}Y\right) +$$

$$Pr\left(\sqrt{P+N} \cdot \bar{q}_2 - \frac{P}{P+N}Y < Z_0 \le \right.$$

$$\left.\sqrt{P+N} \cdot \bar{q}_3 - \frac{P}{P+N}Y\right)$$

$$= 1 + g(2, Y) - g(1, Y) - g(3, Y),$$

where $$g(i, Y) = Q\left(\frac{\sqrt{P+N} \cdot \bar{q}_i - \frac{P}{P+N}Y}{\sqrt{(2PN+N^2)/(P+N)}}\right).$$ Equation (29)

Hence, $$\ln\frac{Pr(X_{b,2} = 0|Y)}{Pr(X_{b,2} = 1|Y)} = \ln\frac{1 + g(2, Y) - g(1, Y) - g(3, Y)}{g(1, Y) + g(3, Y) - g(2, Y)}.$$ Equation (30)

On the other hand, if the first WTRU 210 applies Gray code in the bit conversion, then $X_{b,1}$ and $X_{b,2}$ are given by:

$$(X_{b,1}, X_{b,2}) = \begin{cases} 00, & X \le \sqrt{P+N} \cdot \bar{q}_1; \\ 01, & \sqrt{P+N} \cdot \bar{q}_1 < X \le \sqrt{P+N} \cdot \bar{q}_2; \\ 11, & \sqrt{P+N} \cdot \bar{q}_2 < X \le \sqrt{P+N} \cdot \bar{q}_3; \\ 10, & X > \sqrt{P+N} \cdot \bar{q}_3. \end{cases}$$ Equation (31)

The LLR for the first bit $X_{b,1}$ is again given by Equation (25). The LLR for the second bit $X_{b,2}$ is calculated as follows:

$$Pr(X_{b,2} = 0|Y) = Pr(X \le \sqrt{P+N} \cdot \bar{q}_1 \text{ or}$$ Equation (32)

$$X > \sqrt{P+N} \cdot \bar{q}_3 | Y)$$

$$= Pr\left(Z_0 \le \sqrt{P+N} \cdot \bar{q}_1 - \frac{P}{P+N}Y\right) +$$

$$Pr\left(Z_0 > \sqrt{P+N} \cdot \bar{q}_3 - \frac{P}{P+N}Y\right)$$

$$= 1 + g(3, Y) - g(1, Y),$$

and $$\ln\frac{Pr(X_{b,2} = 0|Y)}{Pr(X_{b,2} = 1|Y)} = \ln\frac{1 + g(3, Y) - g(1, Y)}{g(1, Y) - g(3, Y)}.$$ Equation (33)

In general, for natural coding, the LLR for $X_{b,i}$, $1 \le i \le \log_2 v$, is given by:

$$\ln\frac{Pr(X_{b,i} = 0|Y)}{Pr(X_{b,i} = 1|Y)} = \ln\frac{1 - \sum_{j=1}^{2^{i-1}}(-1)^{j+1} g(j \cdot 2^{\log_2 v - i}, Y)}{\sum_{j=1}^{2^{i-1}}(-1)^{j+1} g(j \cdot 2^{\log_2 v - i}, Y)}.$$ Equation (34)

For Gray coding, the LLR for $X_{b,i}$ is given by:

$$\ln\frac{Pr(X_{b,i} = 0|Y)}{Pr(X_{b,i} = 1|Y)} = \ln\frac{1 - \sum_{j=1}^{2^{i-1}}(-1)^{j+1} g((2j-1) \cdot 2^{\log_2 v - i}, Y)}{\sum_{j=1}^{2^{i-1}}(-1)^{j+1} g((2j-1) \cdot 2^{\log_2 v - i}, Y)}.$$ Equation (35)

Figure 7:
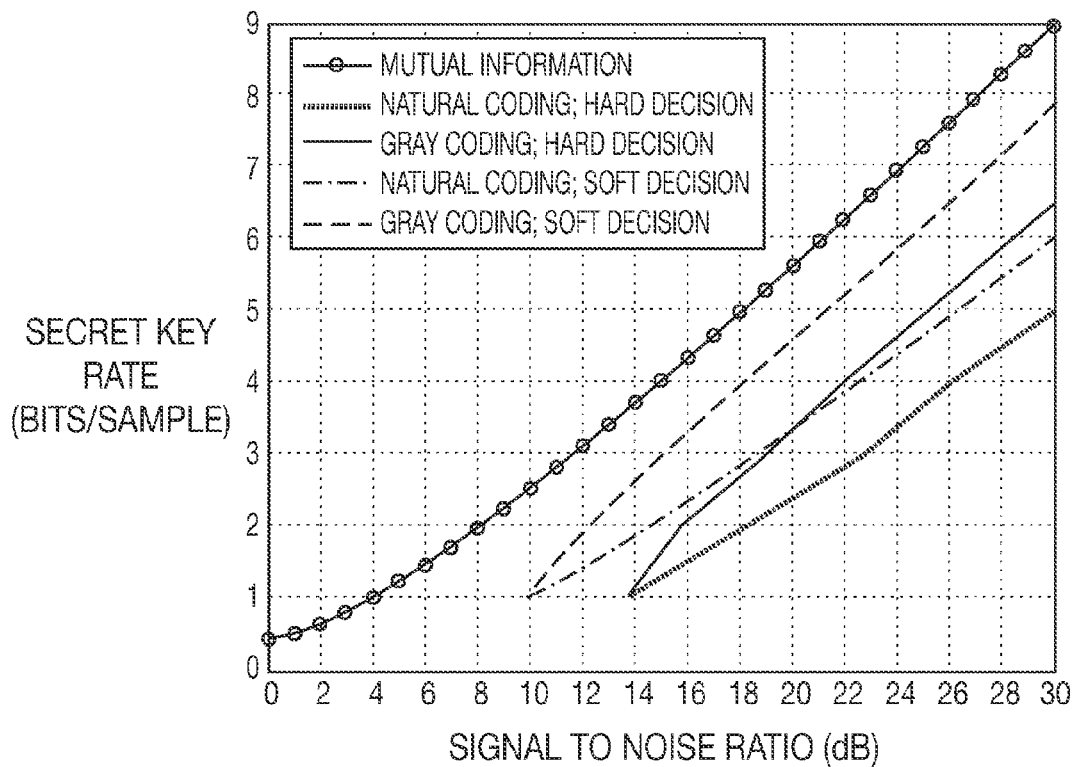
FIG. 7 shows simulation results on the secret key rates resulting from different bit conversion schemes and different LLR computation methods in accordance with the present invention.

Simulation results on the secret key rates resulting from different bit conversion schemes, (i.e., natural coding or Gray coding), and different LLR computation methods, (i.e., hard decision or soft decision), are shown in FIG. 7. The error-correction code used in this simulation is a binary irregular LDPC code of rate ½ and of codeword length 4800 bits. The degree distribution pair of this code is $\lambda(x) = 0.234029x + 0.212425x^2 + 0.146898x^5 + 0.102849x^6 + 0.303808x^{19}$, $\rho(x) = 0.71875x^7 + 0.28125x^8$.

Thirty iterations of the belief-propagation algorithm are allowed.

In simulation, a quantization level is chosen, which actually fixes the secret key rate for the given channel code. Then, by simulation, the minimum SNR is determined such that the resulting keys obtained by the WTRUs have a BER less than $10^{-4}$. This gives an SNR and secret key rate pair. This process is repeated for other quantization levels. Finally, the curves are obtained by plotting the resulting (SNR, secret key rate) pairs. It should be noted that the BER operating point of $10^{-4}$ is selected such that it lies at the steepest gradient of the decoder performance curve so variation of SNR is likely to be quite small. For the purpose of comparison, the secret key capacity is also plotted in FIG. 7.

It is shown from the simulation results that soft decision is better than hard decision, and Gray coding is better than natural coding, in terms of the resulting secret key rates. For example, for a given SNR=18 dB, the secret key capacity is 5.0 bits/sample. The secret key resulting from natural coding and hard decision has a rate of 2.0 bits/sample. The secret key resulting from Gray coding and hard decision has a rate of 2.8 bits/sample. The secret key resulting from natural coding and soft decision has rate of 2.7 bits/sample. While the secret key resulting from Gray coding and soft decision has a rate of 4.0 bits/sample. Soft decision outperforms hard decision because it is better to use the original sample Y, rather than its distorted version Yb, in the estimation of Xb. Gray code outperforms natural code because any two code words in a Gray code, which represent two adjacent quantized values, differ in one bit, while two code words in a natural code, which represent two adjacent quantized values, may differ in more than one bit. Since with relatively high probability, the first and second WTRUs' samples fall in adjacent intervals after quantization, Gray code would thus provide more common bits.

It is observed from FIG. 7 that at high SNR (>15 dB), the secret key rate resulting from Gray coding and soft decision is within 1.1 bits of the secret key capacity. However, the gap between the achieved secret key rate and the secret key capacity is larger at low SNR (<12 dB). The present invention provides a method for reducing this gap at low SNR such that the overall achieved secret key rate is always within 1.1 bits of the secret key capacity.

It is known that quantization more or less incurs information loss. To decrease information loss due to quantization, the first WTRU 210 may quantize its samples at a higher level than the one required for the secret key generation purpose. For example, suppose that the first WTRU 210 and the second WTRU 230 wish to generate a secret key at rate m bits/sample. When using a rate ½ LDPC code, the secret key generation system in FIG. 2 requires the first WTRU 210 to quantize its samples at quantization level m bits/sample. The first WTRU 210 may quantize its samples at a higher level, m+k bits/sample, to decrease quantization loss. The first m quantized bits are called regularly quantized bits, and the last k quantized bits are called over-quantized bits.

Figure 8:
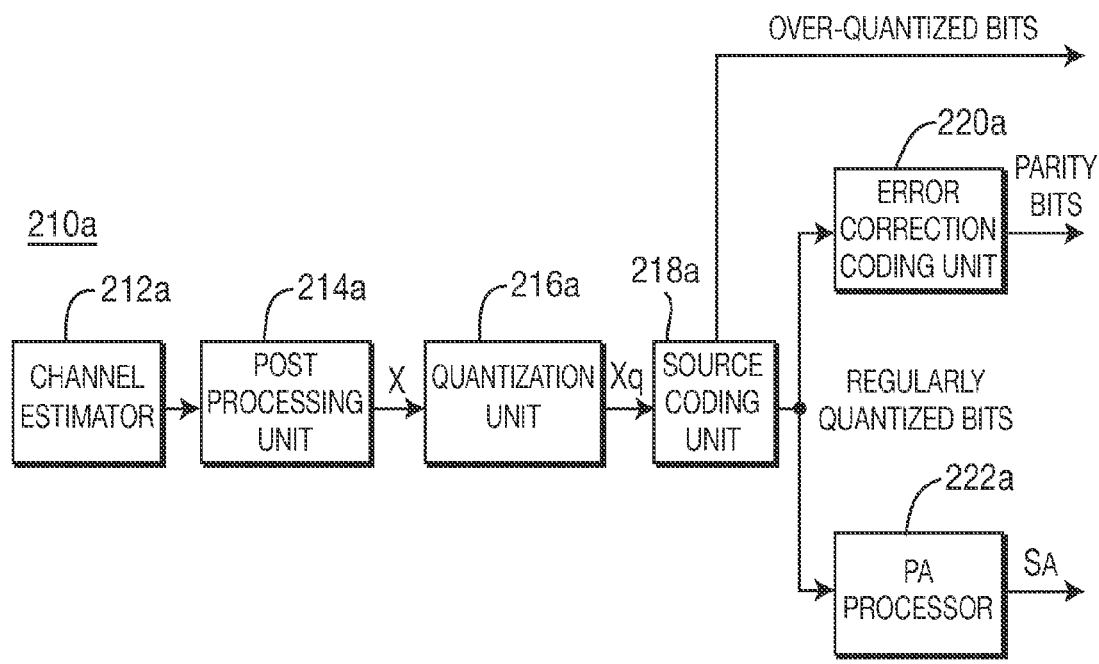
FIG. 8 is a block diagram of a first WTRU configured to perform over-quantization in accordance with the present invention.

FIG. 8 is a block diagram of a first WTRU 210a configured to perform over-quantization in accordance with the present invention. The first WTRU 210a includes a channel estimator 212a, a post processing unit 214a (optional), a quantization unit 216a, a source coding unit 218a, an error correction coding unit 220a and a PA processor 222a. The first WTRU 210a obtains the Gaussian random variable X through CIR measurement of a wireless channel. The random variable X is input into the quantization unit 216a, which outputs quantized values. The quantization unit 216a over-quantizes the random variable. The quantized values are coded into a bit string or a symbol string by the source coding unit 218a.

The generated bit string includes regularly quantized bits and over-quantized bits. The regularly quantized bits are input into the error correction coding unit 220a and the PA processor 222a. The error correction coding unit 220a performs error correction coding, (e.g., non-systematic or systematic block coding), on the regularly quantized bits and generates syndrome (or parity bits). The PA processor 222a generates a secret key from the regularly quantized bits. The first WTRU 210a transmits the syndrome of the regularly quantized bits and the over-quantized bits to the second WTRU over a wireless channel.

A high-level quantizer does not change the bits quantized at a low-level. For instance, the respective partitions of level-2 and level-3 equiprobable quantizers for zero-mean, unit-variance Gaussian distribution are $$S_1=(-\infty,-0.6745], S_2=(-0.6745,0], S_3=(0,0.6745], S_4=(0.6745,\infty);$$

and $$S1=(-\infty,-1.1503], S2=(-1.1503,-0.6745], S3=(-0.6745,-0.3186], S4=(-0.3186,0), S5=(0,0.3186], S6=(0.3186,0.6745], S7=(0.6745,1.1503], S8=(1.1503,\infty).$$

When using the level-2 quantizer followed by natural coding, a sample of X=0.5 is converted to bits '10'. When using the level-3 quantizer, the same sample is converted to bits '100'. The first two bits of '100' are identical to the bits quantized at level-2. Thus, the regularly quantized bits in the over-quantization scheme are actually the same as the bits quantized without using the over-quantization scheme.

The transmission of over-quantized bits over the wireless channel will not leak information about secret key in the case of equiprobable quantization because, in equiprobable quantization, every quantized bit is independent of any other bits. Thus, over-quantized bits are independent of the secret key, which is extracted from regularly quantized bits. On the other hand, over-quantized bits do contain information about regularly quantized bits, when conditioned on correlated samples. Consequently, with the knowledge of the over-quantized bits, the second WTRU can get better LLRs for the first WTRU's regularly quantized bits.

The LLR for the first WTRU's first quantized bit $X_{b,1}$ is given by Equation (25). Suppose the first WTRU uses the level-2 equiprobable quantization and Gray code to convert its sample X to two bits ($X_{b,1}, X_{b,2}$). If the second quantized bit is known to the second WTRU, say, $X_{b,2}=0$, then the LLR for $X_{b,1}$ is calculated as follows:

$$Pr(X_{b,1}=0|Y, X_{b,2}=0) = \frac{Pr(X_{b,1}=0, X_{b,2}=0|Y)}{Pr(X_{b,2}=0|Y)} \quad \text{Equation (36)}$$
$$= \frac{1-g(1,Y)}{1+g(3,Y)-g(1,Y)},$$

and $$\ln\frac{Pr(X_{b,1}=0|Y, X_{b,2}=0)}{Pr(X_{b,1}=1|Y, X_{b,2}=0)} = \ln\frac{Pr(X_{b,1}=0|Y, X_{b,2}=0)}{1-Pr(X_{b,1}=0|Y, X_{b,2}=0)} \quad \text{Equation (37)}$$
$$= \frac{1-g(1,Y)}{g(3,Y)}.$$

Similarly, if $X_{b,2}=1$, then $$Pr(X_{b,1}=0|Y, X_{b,2}=1) = \frac{Pr(X_{b,1}=0, X_{b,2}=1|Y)}{Pr(X_{b,2}=1|Y)} \quad \text{Equation (38)}$$
$$= \frac{g(1,Y)-g(2,Y)}{g(1,Y)-g(3,Y)},$$

and $$\ln\frac{Pr(X_{b,1}=0|Y, X_{b,2}=1)}{Pr(X_{b,1}=1|Y, X_{b,2}=1)} = \frac{g(1,Y)-g(2,Y)}{g(2,Y)-g(3,Y)}. \quad \text{Equation (39)}$$

In general, if the first WTRU 210a quantizes at level m+k bits/sample, in which the first m bits are the regularly quantized bits and the last k bits are the over-quantized bits, then for $1 \leq i \leq m$, $$Pr(X_{b,i}=0|Y, X_{b,m+1}=a_{m+1}, \ldots, X_{b,m+k}=a_{m+k}) \quad \text{Equation (40)}$$
$$= \frac{Pr(X_{b,i}=0, X_{b,m+1}=a_{m+1}, \ldots, X_{b,m+k}=a_{m+k}|Y)}{Pr(X_{b,m+1}=a_{m+1}, \ldots, X_{b,m+k}=a_{m+k}|Y)},$$
$$= \frac{\sum_{j=1}^{2^{k+1}}[g(j-1,Y)-g(j,Y)] \cdot I_{[G^{m+k}(j-1)]_i=0,[G^{m+k}(j-1)]_{m+1}=a_{m+1},\ldots,[G^{m+k}(j-1)]_{m+k}=a_{m+k}}}{\sum_{j=1}^{2^{k+1}}[g(j-1,Y)-g(j,Y)] \cdot I_{[G^{m+k}(j-1)]_{m+1}=a_{m+1},\ldots,[G^{m+k}(j-1)]_{m+k}=a_{m+k}}}$$

where $\alpha_i \in \{0,1\}$, I is the indicator function, and $[G^i(j)]_k$ stands for the $k^{th}$ bit of a length-Gray codeword, which represents integer j. For instance, the 4-bit Gray codeword representing integer 7 is '0100'. Hence, $[G^4(7)]_2=1$ and $[G^4(7)]_3=0$. By convention, $g(0,Y)=1$ and $g(2^{k+1},Y)=0$.

Figure 9:
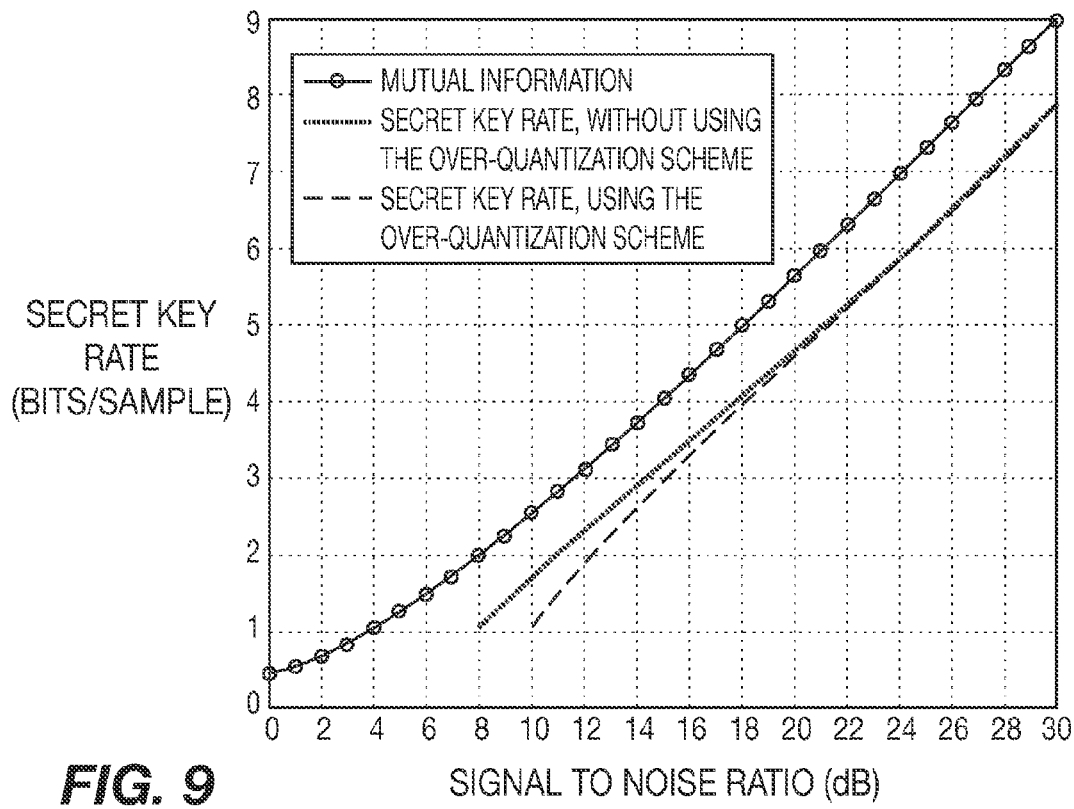
FIG. 9 shows simulation results on the secret key rates achieved by using the over-quantization scheme in accordance with the present invention.

FIG. 9 shows simulation results on the secret key rates achieved by using the over-quantized scheme in accordance with the present invention. Gray coding, soft decision LLR computation methods and the rate ½ irregular LDPC code are used and a target key BER of $10^{-4}$ is achieved in the simulations.

To achieve a secret key rate of 1 bit/sample, it is seen from FIG. 9 that without using the over-quantization scheme, the minimum required SNR (to achieve the target $10^{-4}$ key BER) is 9.7 dB, and the corresponding quantization level is 1 bit/sample. When the first WTRU 210a quantizes at level 2 bits/sample, in which the first bit is a regularly quantized bit and the second bit is an over-quantized bit, simulation shows that the minimum required SNR is reduced to 9.1 dB. This minimum SNR can be further reduced to 8.2 dB and 8 dB, if the first WTRU 210a quantizes at levels 3 bits/sample and 4 bits/sample (in which the first bit is a regularly quantized bit). However, few gains (<0.1 dB on the minimum SNR) are observed at a quantization level higher than 4 bits/sample. Therefore, a total gain of 9.7−8=1.7 dB on the minimum SNR is acquired by using the over-quantization scheme.

Similarly, to achieve a secret key rate of 2 bits/sample, simulation shows that a quantization level of 4 bits/sample, comprising two regularly quantized bits and two over-quantized bits, is high enough to achieve most of the gains from the over-quantization scheme. The resulting minimum SNR is reduced from 12.3 dB (in FIG. 11) to 10.9 dB.

The overall gains by using the over-quantization scheme are listed in Table 3. The corresponding secret key rate is plotted in FIG. 9. The secret key rate without using the over-quantization scheme is also plotted in the same figure for comparison. It is seen from the figure that the secret key rate resulting from the over-quantization scheme is always within 1.1 bits of the secret key capacity.

It is seen from FIG. 9 that the over-quantization scheme does not outperform at high SNR. This indicates that at high SNR, the over-quantized bits are not "useful" in the second WTRU's decoding, which is implicitly verified by the simulation data in Table 4. It is seen from Table 4 that at SNR=21.3 dB, the error probabilities of the $6^{th}$, $7^{th}$ and $8^{th}$ bits quantized from both terminals' samples are close to 0.5. This means that the over-quantized bits of the first WTRU, (i.e., the $6^{th}$, $7^{th}$, $8^{th}$ bits), are almost independent of the second WTRU's sample and the first WTRU's regularly quantized bits. Thus, they are not useful in decoding in the second WTRU.

Table 4 also implies the efficient quantization levels used in the over-quantization scheme. For instance, it is known from Table 3 that to achieve a secret key rate of 1 bit/sample at SNR=8 dB, it is good enough to quantize at level 4 bits/sample. Table 4 shows that higher level quantized bits (i.e., the $5^{th}$, $6^{th}$, $7^{th}$, $8^{th}$ bits) are too "uncorrelated" to be used.

TABLE 4

| Secret key rate (bits/sample) | SNR (dB) | $p_1$ | $p_2$ | $p_3$ | $p_4$ | $p_5$ | $p_6$ | $p_7$ | $p_8$ |
|---|---|---|---|---|---|---|---|---|---|
| 1 | 8 | 0.1680 | *0.2649* | *0.4143* | *0.4721* | 0.4908 | 0.4976 | 0.4978 | 0.5001 |
| 2 | 10.9 | 0.1236 | 0.1975 | *0.3432* | *0.4513* | 0.4807 | 0.4903 | 0.4976 | 0.5018 |
| 3 | 14.2 | 0.0888 | 0.1368 | 0.2526 | *0.4041* | *0.4662* | 0.4846 | 0.4945 | 0.4956 |
| 4 | 17.7 | 0.0580 | 0.0927 | 0.1684 | 0.3175 | *0.4388* | 0.4767 | 0.4882 | 0.4936 |
| 5 | 21.3 | 0.0388 | 0.0618 | 0.1122 | 0.2223 | 0.3768 | *0.4576* | 0.4813 | 0.4907 |

In Table 4, the bold numbers means that the corresponding bits are regularly quantized bits, and the Italic numbers means that the corresponding bits are "useful" over-quantized bits.

In the over-quantization scheme, the regularly quantized bits determine the partition in which a sample lies, while the over-quantized bits specify the range of the sample within that partition. From another point of view, the over-quantized bits actually contain partial information about the (range of) quantization error, (i.e., the different between a sample and its corresponding quanta).

Referring to FIG. 8, instead of sending over-quantized bits, the first WTRU 210a may send the uncoded quantization error of its samples to the second WTRU. The transmission of the uncoded quantization error is equivalent to the transmission of infinite number of over-quantized bits. The scheme of sending uncoded quantization error is known as a soft error-forwarding scheme. Accordingly, the over-quantization scheme is also called a hard error-forwarding scheme. The secret key rate achieved by using the soft error-forwarding scheme is the limit of the secret key rates achieved by using the hard error-forwarding scheme with an arbitrary number of over-quantized bits. The quantization losses related to digital implementation of the soft error-forwarding scheme is ignored here. Thus, the exact quantization error is assumed to be transmitted without error.

TABLE 3

|  | Without over-quantization | | With over-quantization | | |
|---|---|---|---|---|---|
| Secret key rate (bits/sample) | Quantization level | Minimum SNR (dB) | Quantization level | Minimum SNR (dB) | Gain on minimum SNR (dB) |
| 1 | 1 | 9.7 | 4 | 8 | 1.7 |
| 2 | 2 | 12.3 | 4 | 10.9 | 1.4 |
| 3 | 3 | 14.9 | 5 | 14.2 | 0.7 |
| 4 | 4 | 18.1 | 5 | 17.7 | 0.4 |
| 5 | 5 | 21.4 | 6 | 21.3 | 0.1 |

Two practical problems with the soft error-forwarding scheme need to be addressed. The first one is about the independence of quantization error and secret key. It is required that the transmission of quantization error should not leak the information on secret key. However, this requirement is not reached when quantizing a Gaussian random variable. For instance, the partition and quanta of a level-1 equiprobable quantizer for zero-mean, unit-variance Gaussian distribution are:

$$S_1=(-\infty,0], S_2=(0,\infty),$$

and $$q_1=-0.6745, q_2=0.6745.$$

The quantization error for the sample X=2 is X−q(X)=2−0.6745=1.3255. This quantization error indicates that X must be in the partition $S_2$, since otherwise, the quantization error is no more than 0.6745.

In equiprobable quantization of a uniform random variable, the quantization error is uniform and independent of the partition. Hence, it is desirable to calculate and transmit the quantization error in uniform circumstance. This involves the one-to-one mapping from a Gaussian random variable to a uniform random variable. Let X be a random variable with cumulative distribution function (CDF) $F_X(x)$. Then, $Y=F_X(X)$ is a random variable with CDF:

$$F_Y(y)=Pr(Y<y)=Pr(F_X(X)<y)=Pr(X<F_X^{-1}(y))=F_X(F_X^{-1}(y))=y. \qquad \text{Equation (41)}$$

This is the CDF of a uniform distribution on [0,1]. In other words, Y is a random variable uniformly distributed on [0,1]. Denote by $$\phi(x) \equiv \int_{-\infty}^{x} \frac{1}{\sqrt{2\pi}} e^{-\frac{t^2}{2}} dt = 1 - Q(x), \qquad \text{Equation (42)}$$

the CDF for zero-mean, unit-variance Gaussian distribution. Then, $\phi(X)$ is a uniform random variable if X is a Gaussian random variable.

Rather than sending the original quantization error X−q(X), the first WTRU 210a may send the transformed quantization error $E=\phi(X)-\phi(q(X))$. Such an error is independent of the partition q(X), and is uniformly distributed on $$\left[-\frac{1}{2\nu}, \frac{1}{2\nu}\right],$$

with $\nu$ being the number of partitions. Therefore, the transmission of this quantization error does not leak the information about the regularly quantized bits (and, hence, the secret key).

The second practical problem with the soft error-forwarding scheme occurs in the LLR computation. In the over-quantization scheme, the over-quantized bits specify the range of a sample within a given partition. This range contains an infinite number of sample values, and the probability that a sample is within this range is positive. While in the soft error-forwarding scheme, the transmission of uncoded quantization error already restricts the number of possible sample values to finite (specifically, equal to the number of partitions). The overall probability that a sample has one of these possible sample values is zero, as the sample is continuous.

The probability is substituted with a probability density. Referring back to FIG. 8, for example, if the first WTRU 230a quantizes its sample X to a single bit $X_{b,1}$ by using the level-1 equiprobable quantization, then $$E = \phi\left(\frac{X}{\sqrt{P+N}}\right) - \phi(q(X)), \qquad \text{Equation (43)}$$

where $$q(X) = \begin{cases} -0.6745, & X \leq 0 \\ 0.6745, & X > 0, \end{cases} \qquad \text{Equation (44)}$$

and $$\phi(q(X)) = \begin{cases} 0.25, & X \leq 0 \\ 0.75, & X > 0. \end{cases} \qquad \text{Equation (45)}$$

The LLR for $X_{b,1}$ is given by:

$$\ln\frac{Pr(X_{b,1}=0|Y,E=e)}{Pr(X_{b,1}=1|Y,E=e)} = \ln\frac{Pr(X_{b,1}=0,E=e|Y)}{Pr(X_{b,1}=1,E=e|Y)}$$
$$= \ln\frac{Pr(X=\sqrt{P+N}\cdot\phi^{-1}(e+0.25)|Y)}{Pr(X=\sqrt{P+N}\cdot\phi^{-1}(e+0.75)|Y)}$$
$$= \ln\frac{Pr\left(Z_0=\sqrt{P+N}\cdot\phi^{-1}(e+0.25)-\frac{P}{P+N}Y\right)}{Pr\left(Z_0=\sqrt{P+N}\cdot\phi^{-1}(e+0.75)-\frac{P}{P+N}Y\right)} \qquad \text{Equation (46)}$$

As $Z_0$ is a continuous random variable, the probability in either numerator or denominator of Equation (46) is zero. However, by replacing the probabilities with the probability densities, $$\ln\frac{Pr(X_{b,i}=0|Y,E=e)}{Pr(X_{b,i}=1|Y,E=e)} = \ln\frac{e^{-\frac{\left(\sqrt{P+N}\cdot\phi^{-1}(e+0.25)-\frac{P}{P+N}Y\right)^2}{2(2PN+N^2)/(P+N)}}}{e^{-\frac{\left(\sqrt{P+N}\cdot\phi^{-1}(e+0.75)-\frac{P}{P+N}Y\right)^2}{2(2PN+N^2)/(P+N)}}}$$
$$= \frac{h(e,2,2,Y)-h(e,1,2,Y)}{2(2PN+N^2)/(P+N)}, \qquad \text{Equation (47)}$$

where $$h(e,j,\nu,Y) = \left(\sqrt{P+N}\cdot\phi^{-1}\left(e+\frac{2j-1}{2\nu}\right)-\frac{P}{P+N}Y\right)^2, \qquad \text{Equation (48)}$$

with $\nu$ being the number of partitions, and $1 \leq j \leq \nu$.

In general, the LLR for $X_{b,i}$, $1 \leq i \leq \log_2 v$, is given by:

$$\ln \frac{Pr(X_{b,i} = 0|Y, E = e)}{Pr(X_{b,i} = 1|Y, E = e)} =$$

Equation (49)

$$\frac{\sum_{j=1}^{v} h(e, j, v, Y) \cdot I_{[G^{\log_2 v}(j-1)]_i = 1} - \sum_{j=1}^{v} h(e, j, v, Y) \cdot I_{[G^{\log_2 v}(j-1)]_i = 0}}{(2(2PN + N^2)/(P + N))},$$

where I is the indicator and the $[G^i(j)]_k$ function is defined as in Equation (40).

Figure 10:
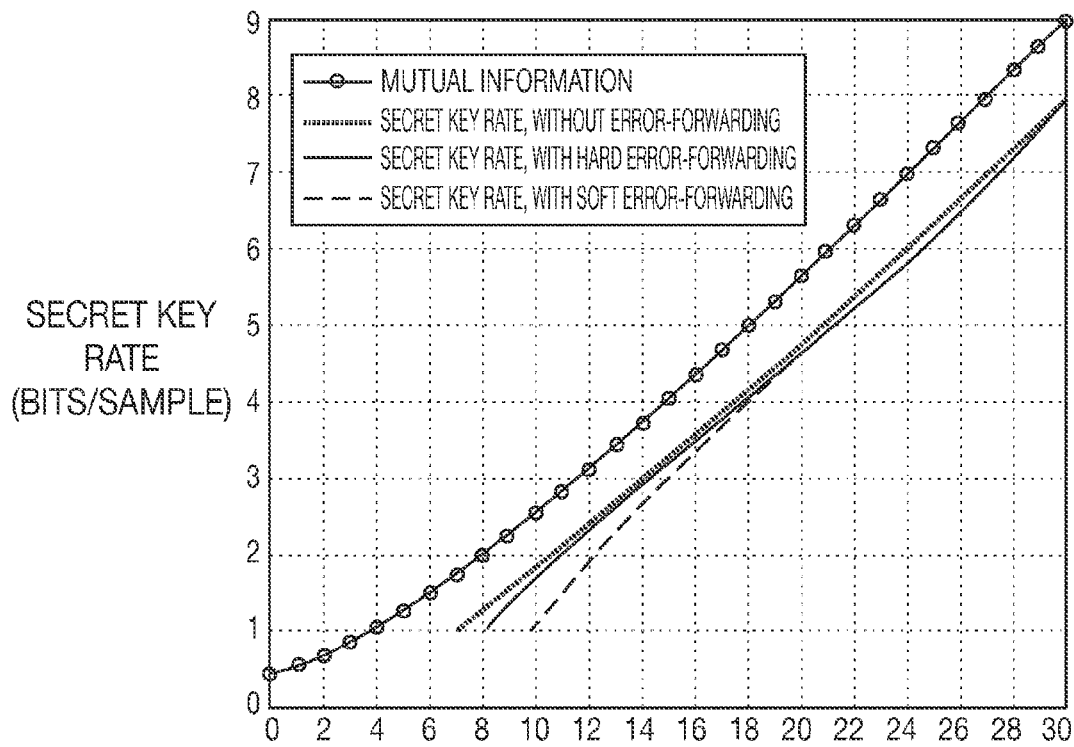
FIG. 10 shows simulation results on the secret key rates achieved by using the soft error-forwarding scheme in accordance with the present invention.

FIG. 10 shows simulation results on the secret key rates achieved by using the soft error-forwarding scheme in accordance with the present invention. The Gray coding and soft decision LLR computation methods are used in the simulations, and the same LDPC code as before is used. The secret key rate achieved by using the soft error-forwarding scheme is plotted as the dotted line in FIG. 10. The secret key rates achieved by using the hard error-forwarding scheme and without using error-forwarding scheme are also plotted in FIG. 10 for comparison. The secret key rate resulting from the soft error-forwarding scheme is larger than that from the hard error-forwarding scheme. The secret key rate resulting from the soft error-forwarding scheme may be considered as the upper bound for the secret key rate resulting from the hard error-forwarding scheme.

In the secret key generation system of FIG. 2, all of the first WTRU's quantized bits are mixed to form a single bit string $X_b$. However, Table 4 shows that each quantized bit in $X_b$ corresponds to a different error probability. Therefore, in accordance with another embodiment of the present invention, each quantized bit may be separately processed for a higher secret key rate. This method is called per bit processing scheme.

Figure 11:
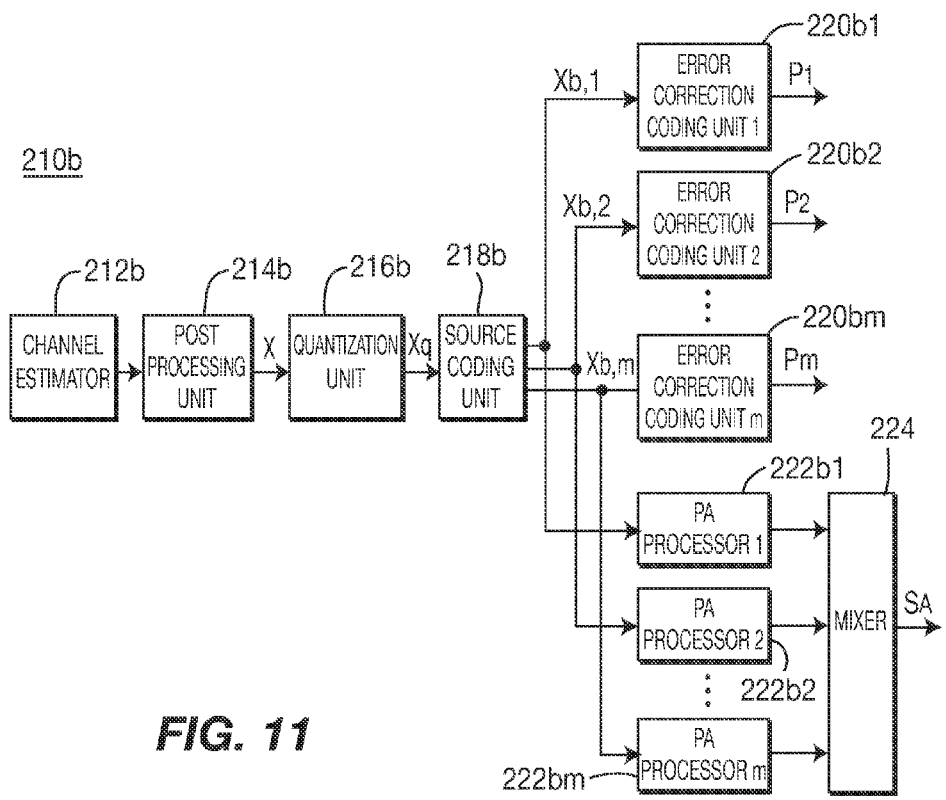
FIG. 11 is a block diagram of the first WTRU configured to perform per bit processing in accordance with the present invention.

FIG. 11 is a block diagram of the first WTRU 210b configured to perform per bit processing in accordance with the present invention. The first WTRU 210b includes a channel estimator 212b, a post processing unit 214b (optional), a quantization unit 216b, a source coding unit 218b, a plurality of error correction coding units 220b1-220bm, a plurality of PA processors 222b1-222bm and a mixer 224. The first WTRU 210b obtains the Gaussian random variable X through CIR measurement of a wireless channel. The random variable X is input into the quantization unit 216b, which outputs quantized values. The quantized values are coded into a string of bits by the source coding unit 218b.

Suppose that the first WTRU 210b quantizes the sample at level m bits/sample. These m quantized bits are channel coded by m block error correction codes of the same block length, but of different rates. This results in m per bit syndromes $P_1, \ldots, P_m$ of different lengths. These m coded bits are separately processed by each PA processor 222b1-222bm. The universal hash functions in the PA processes 222b1-222bm have the same domain, but have different ranges. The range of the universal hash functions is smaller for higher level quantized bits. The outputs of the PA processors 222b1-222bm are combined to a single secret key by the mixer 224.

Figure 12:
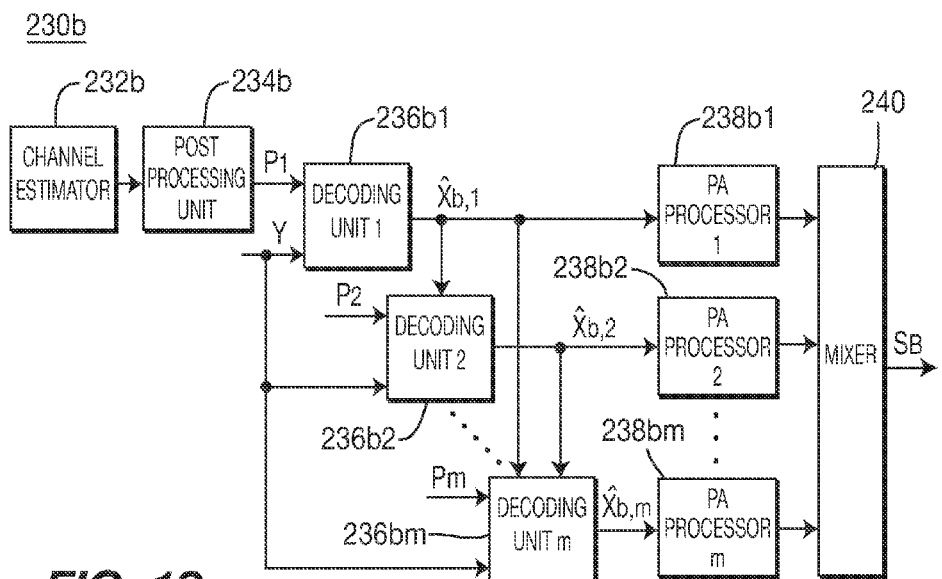
FIG. 12 is a block diagram of a second WTRU configured to perform per bit processing in accordance with the present invention.

FIG. 12 is a block diagram of a second WTRU 230b configured to perform per bit processing in accordance with the present invention. The second WTRU 230b includes a channel estimator 232b, a post processing unit 234b (optional), a plurality of decoding units 236b1-236bm, a plurality of PA processors 238b1-238bm and a mixer 240. The second WTRU 230b obtains the Gaussian random variable Y through CIR measurement of a wireless channel between the first WTRU 210b and the second WTRU 230b. Each per bit parity bits (or syndrome) $P_1, \ldots, P_m$, received from the first WTRU 210b is input into a corresponding decoding unit 236b1-236bm. Each decoding unit 236b1-236bm decodes the source coded bit of the first WTRU 210b from the received syndrome (or parity bits) and the random variable Y. The first decoding unit 236b1 decodes $\hat{X}_{b,1}$ based on (Y, $P_1$). The second decoding unit 236b2 then decodes $\hat{X}_{b,2}$ based on (Y, $P_2$, $\hat{X}_{b,1}$), etc. The knowledge of $\hat{X}_{b,1}$ helps the first decoding unit acquire a better LLR for $\hat{X}_{b,2}$.

Each of the decoded bits is input into the corresponding PA processor 238b1-238bm. Finally, the second WTRU 230b extracts a secret key from ($\hat{X}_{b,1}, \ldots, \hat{X}_{b,m}$) in the same manner as the first WTRU 210b. The PA processors 238b1-238bm and the mixer 240 perform the same processing as in the first WTRU 210b. The outputs of the PA processors 238b1-238bm are combined to a single secret key by the mixer 240.

Figure 13:
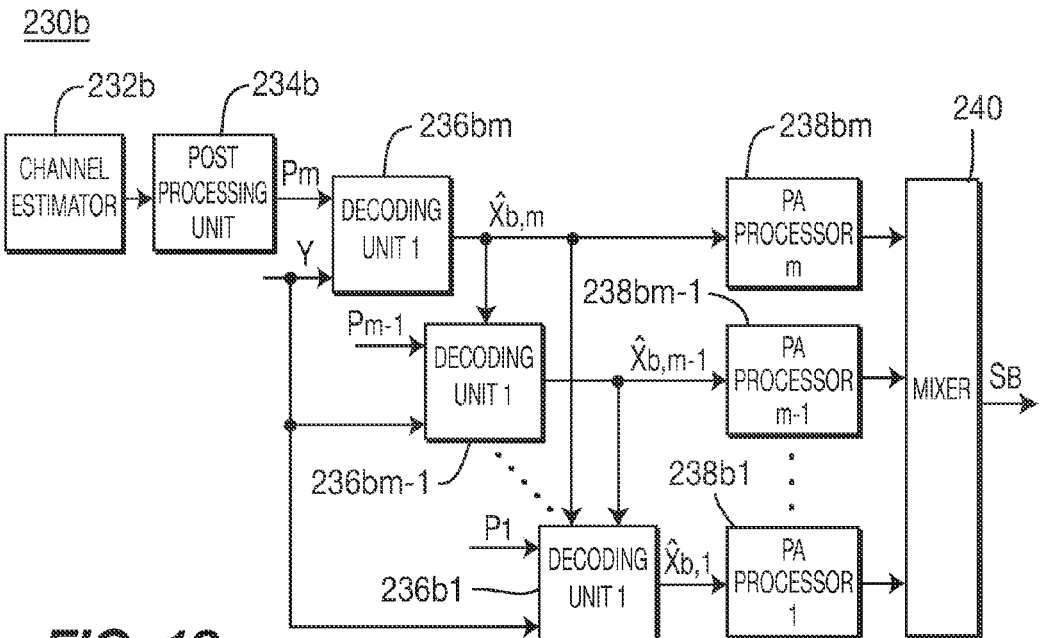
FIG. 13 is a block diagram of an alternative embodiment of the second WTRU configured to perform per bit processing in accordance with the present invention.

FIG. 13 is a block diagram of an alternative embodiment of the second WTRU 230b configured to perform per bit processing in accordance with the present invention. In this alternative, the source bits are decoded in the opposite order as in FIG. 12. The m-th decoding unit 236bm decodes $\hat{X}_{b,m}$ based on (Y, $P_m$), which is processed by the m-th PA processor 238m, the second to last decoding unit 236b(m-1) decodes $\hat{X}_{b,m-1}$ based on (Y,$P_{m-1}$, $\hat{X}_{b,m}$), which is processed by the PA processor 238b(m-1), etc.

Figure 14:
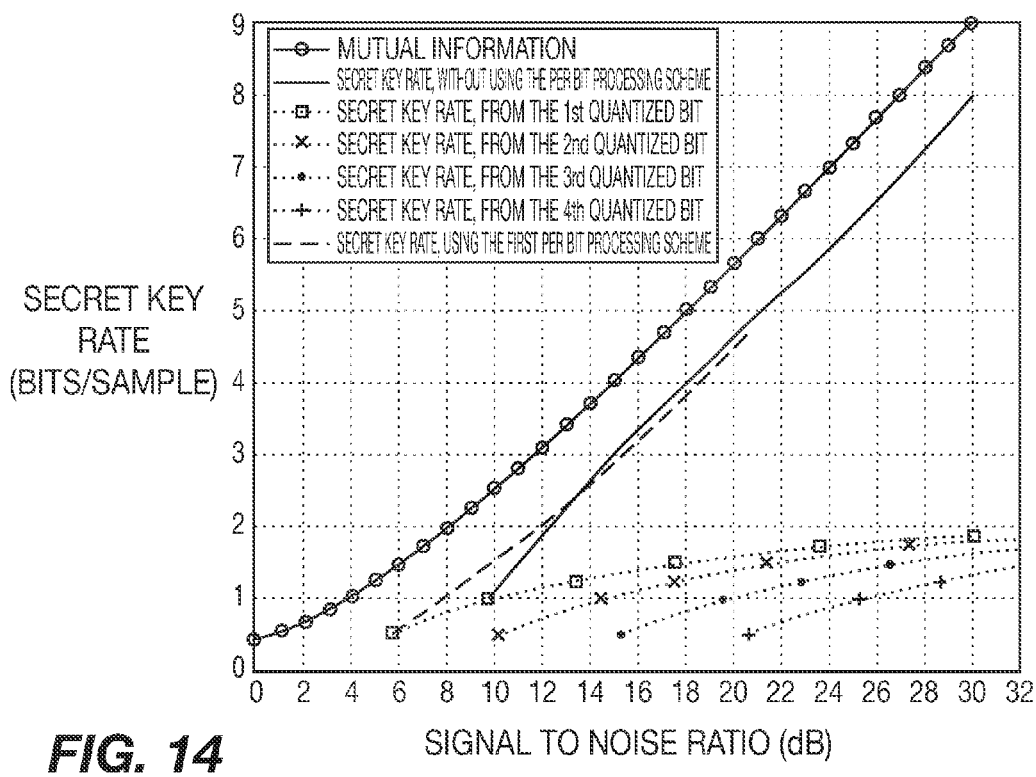
FIGS. 14 and 15 show simulation results for comparing the performance in terms of the secret key rates achieved by using the per bit processing schemes.
Figure 15:
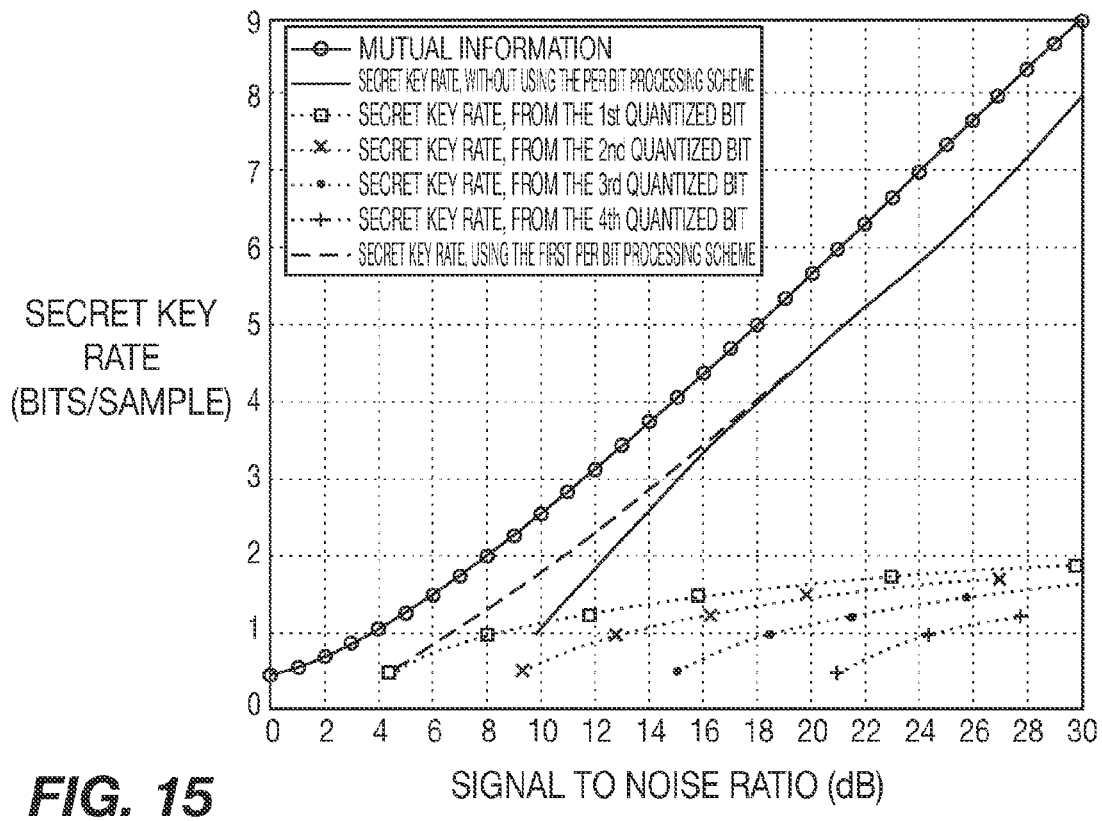

FIGS. 14 and 15 show simulation results comparing the performance in terms of the secret key rates achieved by using the per bit processing schemes. Gray coding and soft decision LLR computation methods are used in the simulations. Besides the rate ½ irregular LDPC code, rate 15/16 regular (3, 48) LDPC code, rate 7/8 regular (3, 24) LDPC code, rate 3/4 regular (3, 12) LDPC code, rate 5/8 regular (3, 8) LDPC code, and rate 1/4 regular (3, 4) LDPC code are used. The block lengths of all these codes are 4800 bits, and thirty iterations of the belief-propagation algorithm are allowed.

Based on the simulation results, it is determined that the second per bit processing scheme outperforms the first per bit processing scheme in terms of the resulting secret key rate. By comparing FIGS. 9 and 15, the second per bit processing scheme outperforms the over-quantization scheme at low SNR. This is because the second per bit processing scheme actually implements the idea of implicit transmission of over-quantized bits, namely transmitting the syndrome of over-quantized bits. Therefore, additional secret bits can be extracted from over-quantized bits. Consequently, the secret key rate is increased.

Every curve shown in FIG. 7 for the secret key rate is obtained by plotting several (SNR, secret key rate) points. Simulations show the achievability of those (SNR, secret key rate) points, but not other points on a curve. A direct way to achieve an arbitrary point on a secret key rate curve is using a unique channel code for that point. The rate of that channel code is designed particularly for the given SNR. Specifically, the determination of the code rate is such that the resulting syndrome has the smallest length, while it still enables the correct decoding.

This approach requires that the first WTRU and the second WTRU store an infinite number of channel codes, each working for a particular SNR. However, it is practically infeasible. The present invention introduces a simple implementation of multiple channel codes. With this implementation, the first WTRU and the second WTRU only need to store a single (or a small number of) low-rate LDPC code.

According to the secret key generation system in accordance with any embodiments described above, the first WTRU sends the syndrome of its quantized bits to the second WTRU. In many cases, the second WTRU could correctly decode the first WTRU's quantized bits based on a subset of that syndrome. Furthermore, the transmission of the whole syndrome may reduce the secret key rate as more information bits than necessary are revealed. Hence, the first WTRU may transmit a punctured version of the parity bits (or syndrome) and informs the second WTRU of the puncturing positions on the syndrome (or parity bits). Considering the randomness of a LDPC code, the puncturing positions are usually uniformly distributed.

Actually, the puncturing of the parity bits is equivalent to deriving a higher rate LDPC code from the original one. The parity check matrix of the new LDPC code is formed by simply selecting several rows from the parity check matrix of the original LDPC code. The row selection depends on the puncturing positions on a syndrome. Then, the punctured version of the parity bits (or syndrome) is exactly the same as the parity bits (or syndrome) with respect to the new LDPC code. Generically, the puncturing scheme is a case of using rate matching and variable code rates to accommodate different levels of variability.

The second WTRU uses the derived LDPC code in decoding. If the decoding fails, the second WTRU asks the first WTRU to send more syndrome bits. By this approach, no more syndrome bits than needed are transmitted.

Due to different noise scaling and different CIR measurement devices used at the first WTRU and the second WTRU, the actual SNR at the first WTRU is likely to be distinct with that at the second WTRU, (i.e., $$SNR_A = \frac{P}{N_A}$$

is likely to be different from $$SNR_B = \frac{P}{N_B}).$$

In this general case, the secret key capacity in Equation (13) may be written as a function of $SNR_A$ and $SNR_B$ as follows:

$$C_S = \log_2\left(1 + \frac{SNR_A SNR_B}{SNR_A + SNR_B + 1}\right). \quad \text{Equation (50)}$$

Figure 16:
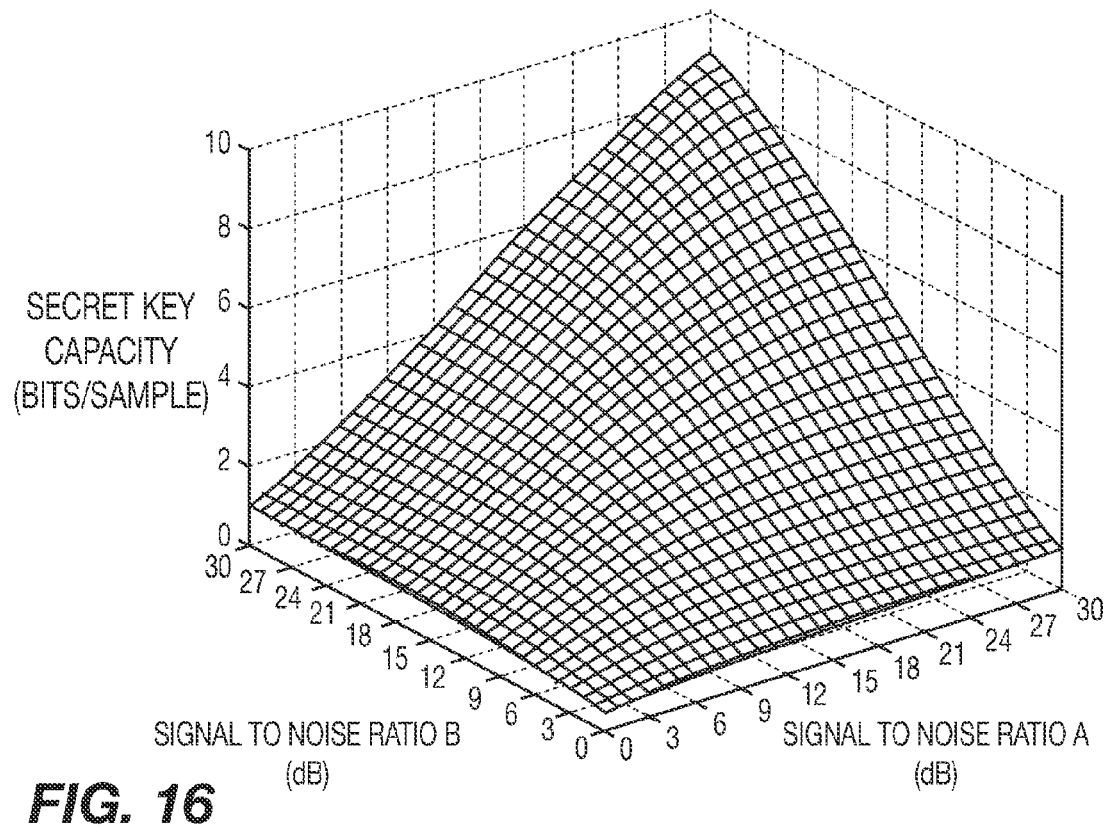
FIG. 16 shows a plot of the secret key capacity Cs vs. $SNR_A$ and $SNR_B$ for a single-path Rayleigh fading channel.

A plot of the secret key capacity Cs vs. $SNR_A$ and $SNR_B$ is shown in FIG. 16.

Figure 17:
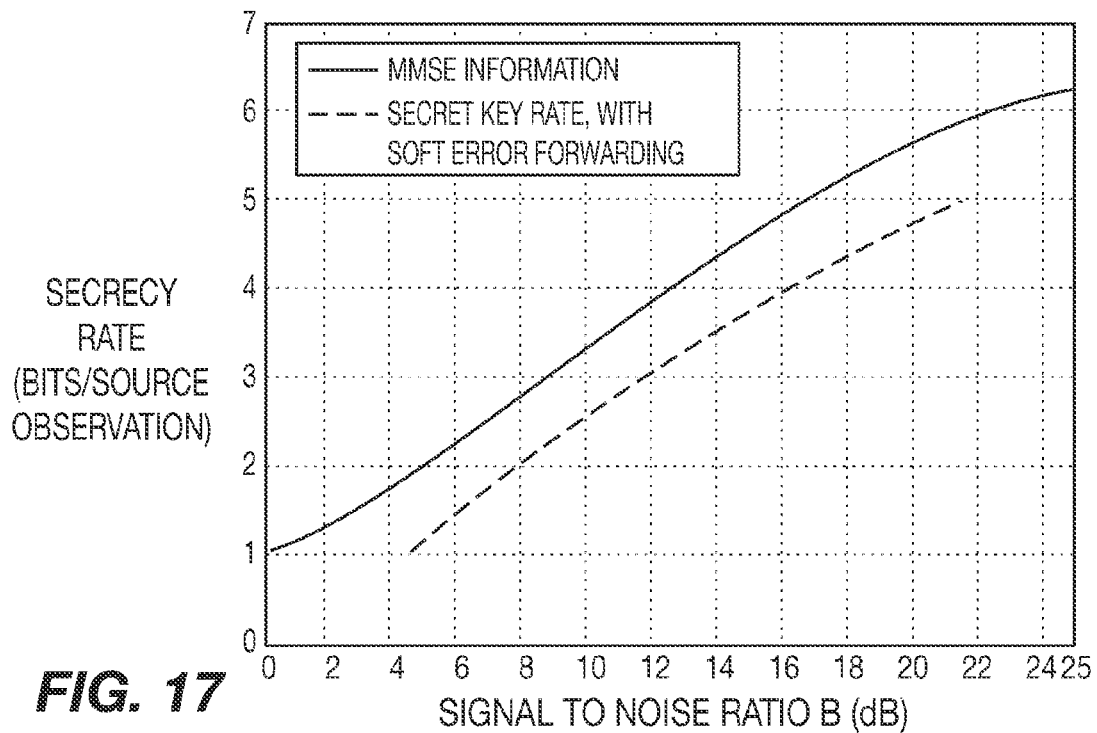
FIGS. 17-19 show the achieved secret key rates vs. $SNR_B$, with fixed $SNR_A$=20 dB, 25 dB, 30 dB, respectively.
Figure 18:
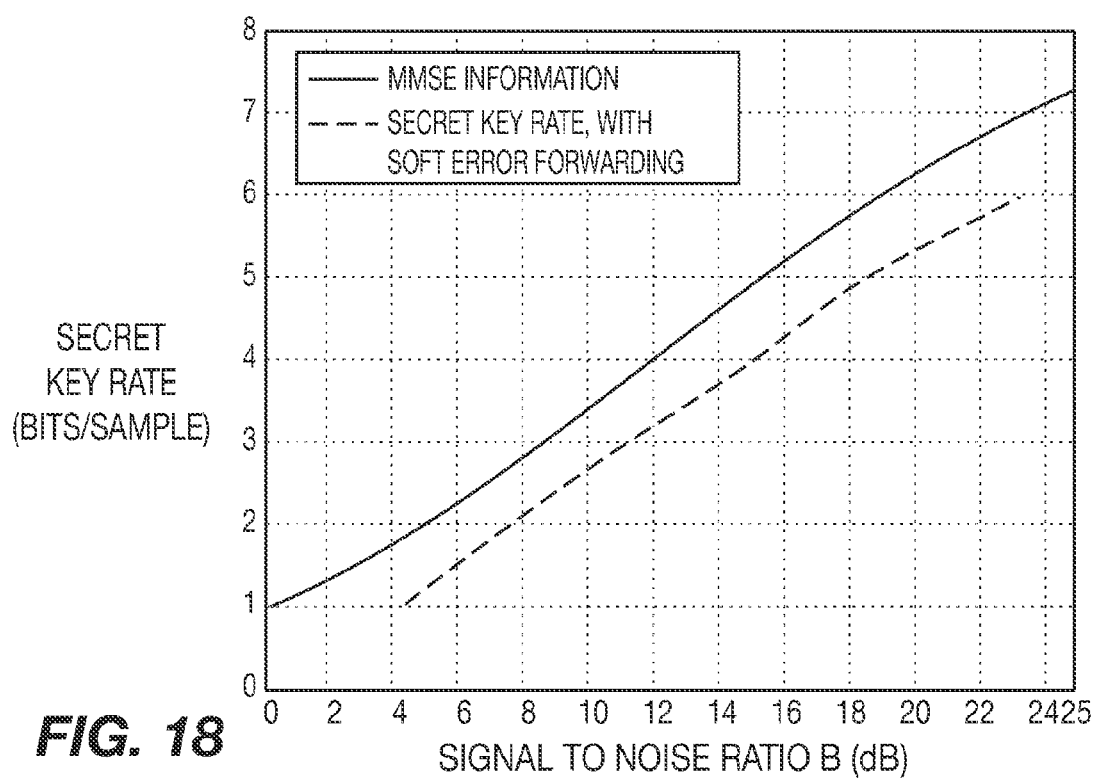
Figure 19:
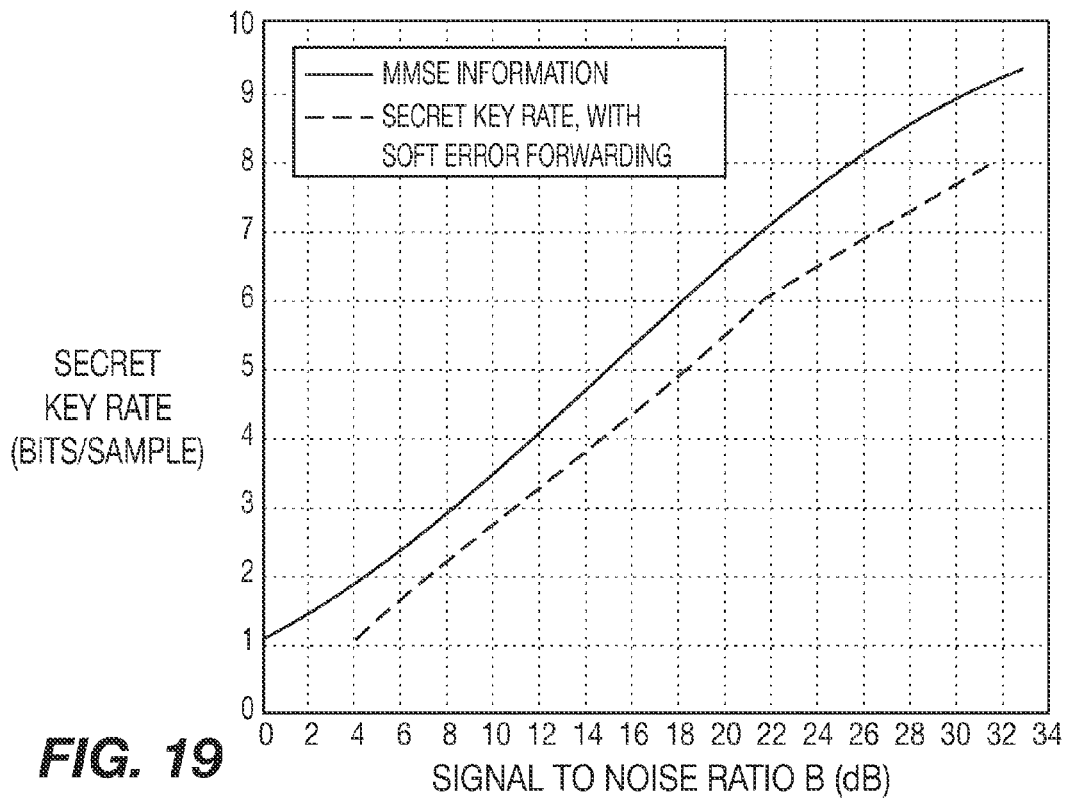

Following the same techniques used for the identical SNR case, a secret key can be generated for this general case. FIGS. 17-19 show the achieved secret key rates vs. $SNR_B$, with fixed $SNR_A$=20 dB, 25 dB, 30 dB, respectively. The achieved secret key rates using the soft error-forwarding scheme are drawn as the dashed line in FIGS. 17-19. A gap of around 1 dB between the achieved secret key rate and the secret key capacity is observed in each of these figures. These simulation results verify that the schemes developed for the identical SNR case can be directly applied to the general case, without performance loss.

The present invention is extended to multiple-input multiple-output (MIMO) as follows. The general approach is the same as for the scalar case, but with vector quantization for jointly Gaussian vectors replacing the scalar quantization. The first WTRU has $T_A$ antennae and the second WTRU has $T_B$ antennae. Both the first WTRU and the second WTRU estimate $T=T_A \times T_B$ total CIRs. The vector of estimates of the first WTRU is $h_A$ and the vector of estimates of the second WTRU is $h_B$. Each one of these vectors contains correlated values and the two are highly correlated. The equivalent is:

$$h_A = M_A h + z_A; \quad \text{Equation (51)}$$

$$h_B = M_B h + z_B, \quad \text{Equation (52)}$$

where $M_A$, $M_B$ are appropriately sized matrices, $z_A$, $z_B$ are noise vectors, h is "true" CIR vector which is modified at each terminal through some known matrix related to each transmitter and receiver structure.

The MIMO case is addressed in the same manner as the non-MIMO case with some minor modifications as follows:

1) A noise whitening filter may be required at the first WTRU and the second WTRU if the noise vectors are not white (but are of known covariance).

2) The information about noise whitening filters and the matrices $M_A$ and $M_B$ is exchanged between the first WTRU and the second WTRU in the clear.

3) Vector quantization for jointly Gaussian vectors is used instead of scalar quantization.

The first WTRU and the second WTRU separate the MIMO channel into a plurality of eigenmodes which have the properties of virtual single-antenna non-interfering subchannels. The first WTRU and the second WTRU then may generate the secret key from at least one eigenmode by applying any method described in the present invention.

Referring back to FIG. 2, with respect to the post processing units 214, 234, the sampled CIR may be processed by the post processor 214, 234 to eliminate noise caused by the sampling time difference between the first WTRU 210 and the second WTRU 230 and remove the redundancy in the CIR samples. The sampled CIR comprises highly correlated samples. In order to generate full entropy strings, it is necessary to remove the correlation among the samples. As stated in the background, for multipath channels, it does not work by simply selecting several samples (one sample per path) from all the samples as those selected samples will be correlated with each other. Another practical problem is related to the sampling time difference between two terminals. Merely increasing the sampling rate has a disadvantage of generating highly redundant samples. The present invention solves these problems preferably by using the Orthogonal Greedy Algorithm (OGA), which is used to reconstruct discrete pulses a(t) of a reciprocal wireless channel from the sampled CIR.

The detailed OGA operations are described hereinafter. Let $H(f)$ and $P(f)$ be the Fourier transforms of the sampled CIR h[n] and sampled pulse shape $p[n]=p(nT_S)$, respectively. Let THR be a pre-determined threshold. Set $H_1(f)=H(f)$, and $l=1$.

Step 1: Find $m>0$, $\phi \in [0,2\pi)$ and $\tau \in R$, which minimize $\|H_l(f)-me^{j\phi}P(f)e^{-j2\pi f\tau}\|_2$. Denote these by $m_l, \phi_l, \tau_l$, and let $\alpha_l = m_l e^{j\phi_l}$.

Step 2: Set $H_{l+1}(f)=H_l(f)-\alpha_l e^{-2\pi f \tau_l}$.

Step 3: If $\|H_{l+1}(f)\|_2 <$ THR, then output $(\alpha_1, \tau_1), \ldots, (\alpha_l, \tau_l)$ and stop. Otherwise, let $l=l+1$ and return to Step 1.

It can be derived from Step 1 that:

$$(\phi_l, \tau_l) = \underset{(\phi,\tau)}{\operatorname{argmax}} \operatorname{Re}\left\{e^{j\phi} \sum_{n=-\infty}^{\infty} h_l[n] p_\tau^*[n]\right\}, \quad \text{Equation (53)}$$

and $$m_l = \frac{\operatorname{Re}\left\{e^{j\phi_l} \sum_{n=-\infty}^{\infty} h_l[n] p_{\tau_l}^*[n]\right\}}{\|P(f)\|_2^2}, \quad \text{Equation (54)}$$

where $p_\tau[n] = p(nT_S - \tau)$ and $h_l[n]$ is the inverse Fourier transform of $H_l(f)$. The Equations (53) and (54) suggest first correlating $h_l[n]$ against all delayed-and-sampled versions of $p(t)$. The optimum $\tau_l$ is the delay for which the absolute value of the correlation is maximum; the optimum $\phi_l$ is minus the angle of the correlation at $\tau_l$; and the optimum $m_l$ is the absolute value of the correlation at $\tau_l$, divided by the square of the $l^2$-norm of $P(f)$.

In practice, it is impossible to correlate against all the values of $\tau$. $p_{\tau_1}[n]$ and $p_{\tau_2}[n]$ are delayed versions of each other if $(\tau_1 - \tau_2)$ is an integer. If the time line is discretized such that the time grid spacing is $$\frac{1}{T_G},$$

for some integer $T_G$, a finite bank of filters are implemented, each representing $p_\tau[n]$ for a different fractional delay $\tau \in [0, 1)$. Hence, the dictionary is actually the set of pulse shapes, each delayed by $$\frac{1}{T_G}.$$

This dictionary may not satisfy the constraints required for OGA to solve the sparsest problem, and the sparsest solution given by OGA may not always be the correct one. This is seen from simulations.

Alternatively, instead of the $l^2$-norm of the residual signal below some threshold, an alternative stopping rule of OGA may be based on the absolute value of a selected signal. In other words, if the absolute value of a selected signal is below a pre-determined threshold, this "signal" is considered as noise and the algorithm stops. Thus, the last step of OGA is replaced by the following:

Step 3 (alternative): If $m_l$<THR, then output $(\alpha_1, \tau_1), \ldots, (\alpha_{l-1}, \tau_{l-1})$ and stop. Otherwise, let $l=l+1$ and return to Step 1. While other stopping rules may be applied, for simplicity, the present invention will consider only this alternative stopping rule hereafter.

When the OGA loop is terminated depends on the threshold value. A large threshold value corresponds to few iterations (and hence, few pulses or paths), while a small threshold value corresponds to many iterations (and hence, many pulses or paths). A proper threshold is essential for OGA to detect the correct number of underlying paths.

Figure 20:
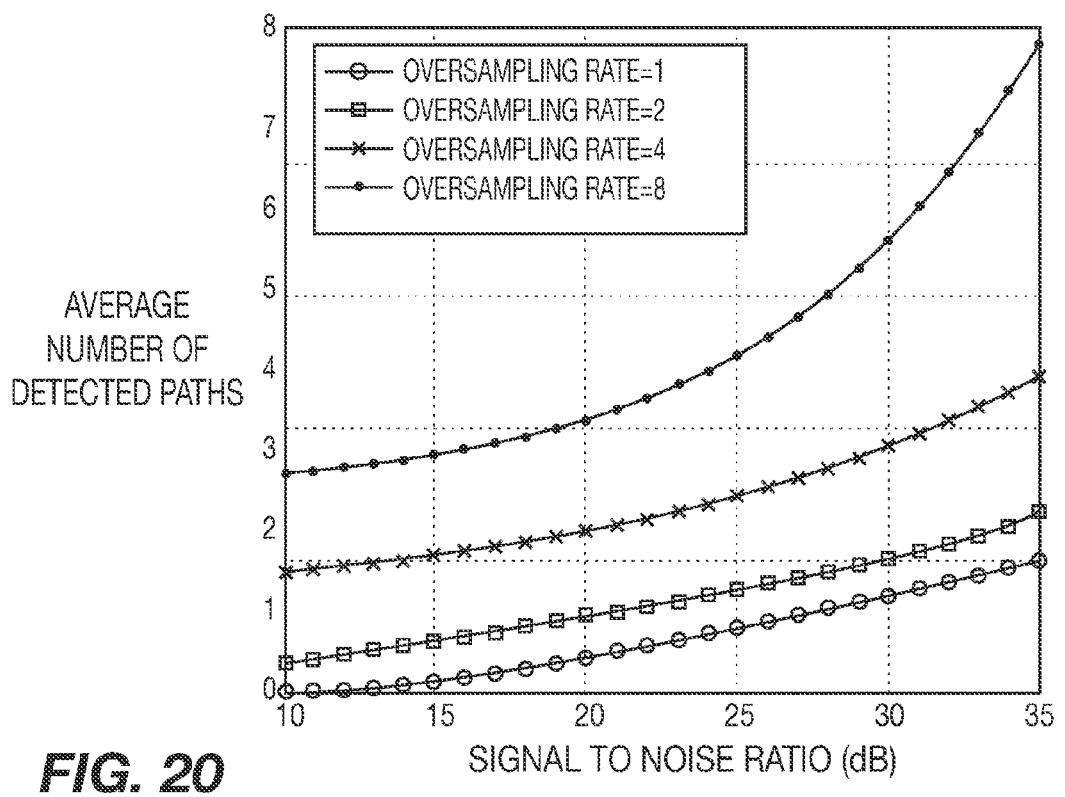
FIG. 20 shows average number of paths detected by orthogonal greedy algorithm (OGA) with constant threshold, for a working group 4 (WG4) Case 3 channel.

Finding a good threshold is not easy as the proper value increases with both SNR and sampling rate in general. If the threshold is a constant, then the number of paths detected by OGA increases with SNR and sampling rate. This is illustrated in FIG. 20 for a 3GPP WG4 Case 3 channel. The oversampling rate in FIG. 10 stands for the ratio of the actual sampling rate over the Nyquist rate given the transmission bandwidth. It is shown in FIG. 20 that at an oversampling rate=2, the average number of paths detected by OGA is about 2 at SNR=15 dB, and this number goes up to 5 at SNR=30 dB.

Alternatively, the threshold value may be tied to the signal itself. For example, the threshold is set as a portion of the absolute value of the first selected signal. The threshold may be set, for example, to 0.8+SNR(in dB)/10 of the absolute value of the first selected signal. This has two important benefits. It is much more robust in the real-world scenario as it depends significantly less on knowing actual channel conditions. In addition, it guarantees that the OGA always outputs at least one value.

Step 3 of OGA is refined as follows:
Step 3 (alternative): If $$m_l < \frac{m_1}{0.8 + \frac{SNR}{10}}$$

and $l>1$, then output $(\alpha_1, \tau_1), \ldots, (\alpha_{l-1}, \tau_{l-1})$ and stop; Otherwise, let $l=l+1$ and return to Step 1.

Figure 21:
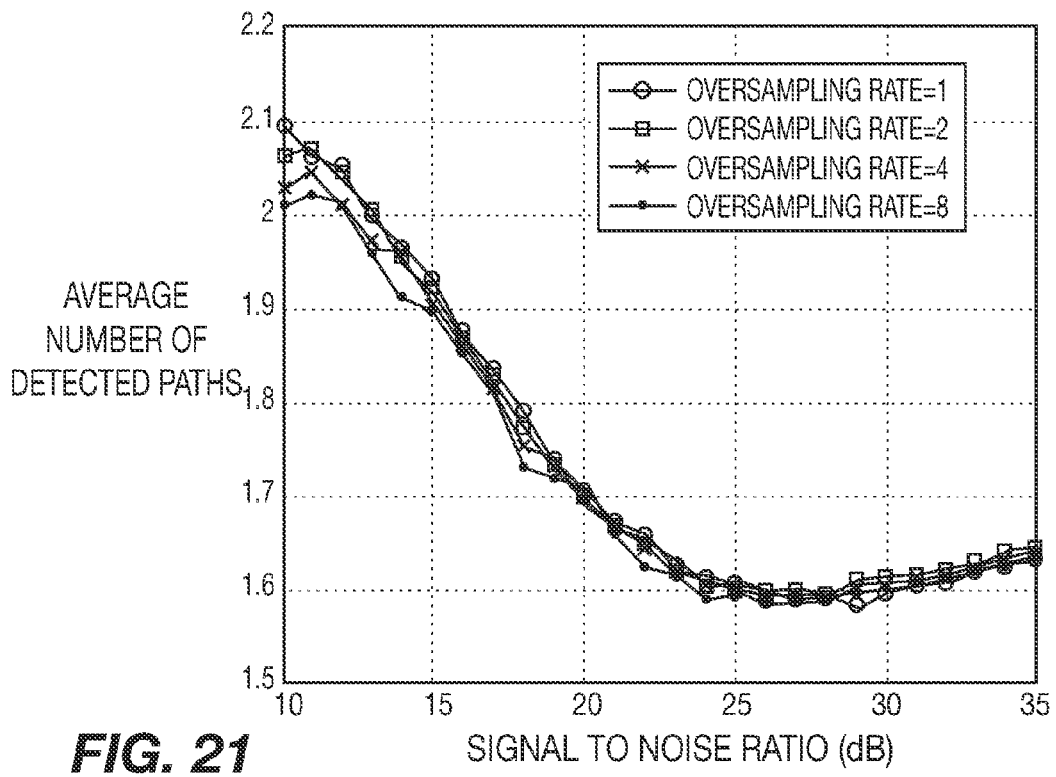
FIGS. 21 and 22 show the respective average number of paths detected by OGA with this relative threshold, for WG4 Case 1 and WG4 Case 3 channels, respectively.
Figure 22:
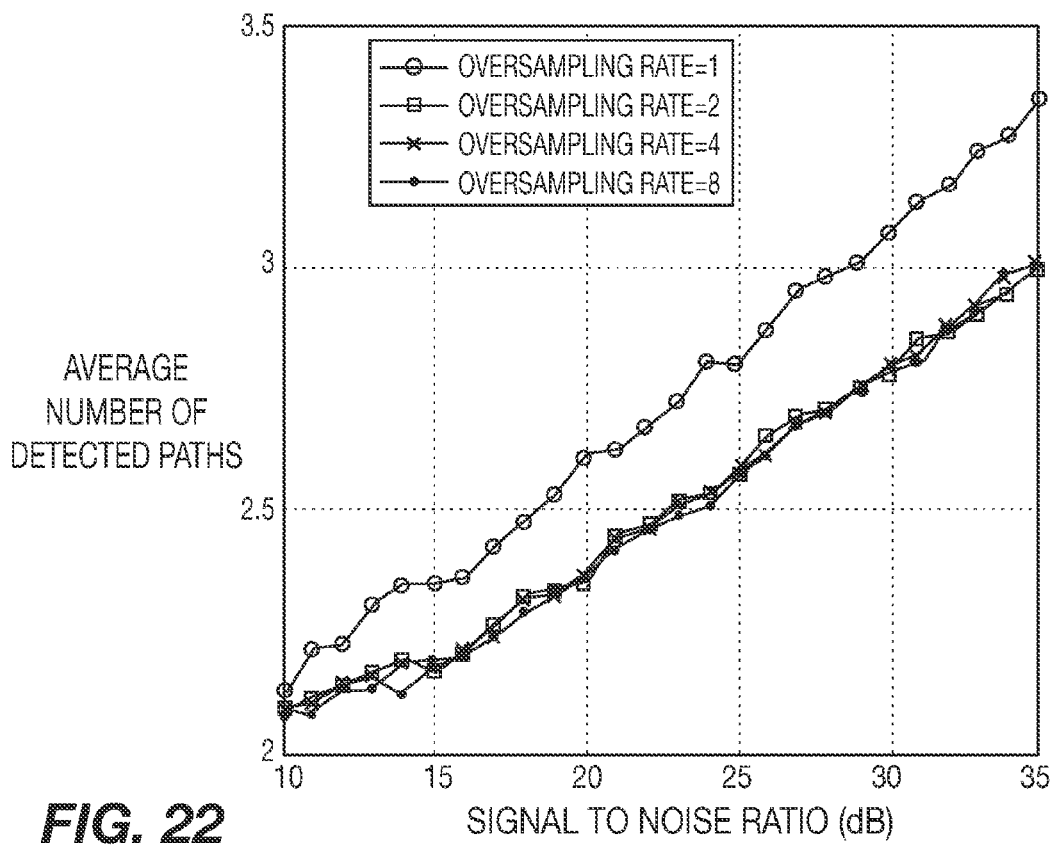

While other methods of computing a threshold or other thresholds may be used, simulations show that with this relative threshold, the average number of paths detected by OGA almost remains invariant with SNR and sampling rate, when SNR is between 10 dB and 35 dB. Furthermore, that average number is close to the underlying number of paths for most WG4 channels. For example, FIGS. 21 and 22 show the respective average number of paths detected by OGA with this relative threshold, for WG4 Case 1 and WG4 Case 3 channels, respectively. It can be seen from FIGS. 21 and 22 that the average number of detected paths are around 1.8 and 2.5 (compared with 2 and 4 underlying paths) for WG4 Case 1 and WG4 Case 3 channels, respectively. This relative threshold is used in all the simulations hereafter.

Figure 23:
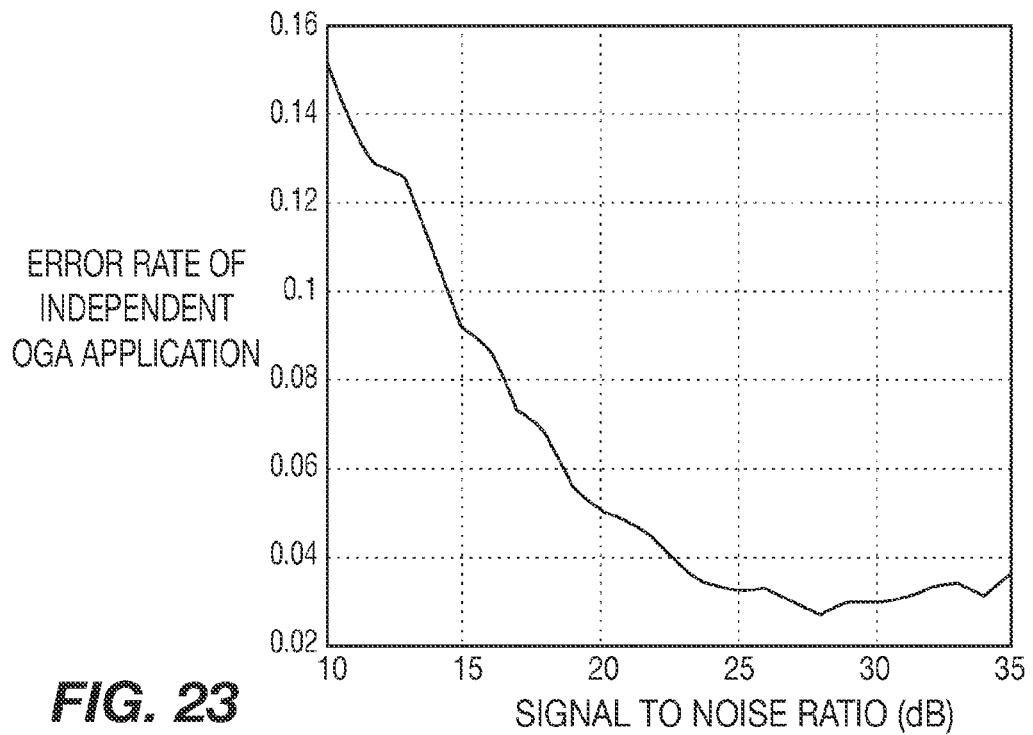
FIG. 23 shows the error rate of independent OGA application at both terminals for a WG4 Case 3 channel.

The goal of OGA is to find the same paths at both the first WTRU and the second WTRU. It should be noted that OGA is provided as an example, and any conventional methods for detecting multipath components may be implemented for this goal. Hence, the error rate of independent OGA application is tested at both terminals. The two lists of path delays detected by the first WTRU and the second WTRU are compared. An error is declared if for a path delay in the shorter list, there is no corresponding value within a tolerance error margin, when comparing with the longer list. Many forms of measuring the tolerance may be used and in this case, a 20% of channel-transmitted symbol time period, (e.g., chip time period in CDMA), is used as the tolerance margin. The presence of "extra" paths in the longer list is not considered as an error. FIG. 23 shows the error rate of independent OGA application at both terminals for a WG4 Case 3 channel. It can be seen from FIG. 23 that the error rate is high at low SNR, but it decreases with SNR. This error affects the performance of some schemes discussed below.

By independently applying OGA on its channel observations, each terminal can get a sequence of pairs of path delay $\tau_l$ and path amplitude $\alpha_l$. The path amplitudes are independent complex Gaussian random variables, and thus this is exploited for the subsequent secret key construction. The path delays, as supplemental information, enable the first WTRU and the second WTRU to align their measurements.

Although the mean of these path amplitudes are known to be zero, (as each single path experiences Rayleigh fading), the variances of these path amplitudes are unknown. During quantization, the knowledge on the variances of these path amplitudes facilitates the quantization process. This knowledge may be obtained by estimation. The estimation of the variances should be performed per path, as different average path powers leads to different path variances.

According to the above scheme, OGA is applied once at the first WTRU 210 and the second WTRU 220. Hence, this scheme is called a single pass scheme.

Not all the underlying paths can be detected by OGA for every channel observation and the loss of information contained in those un-detected paths, as well as the error rate of independent OGA application at both terminals lead to the poor performance of the single pass scheme.

Figure 24:
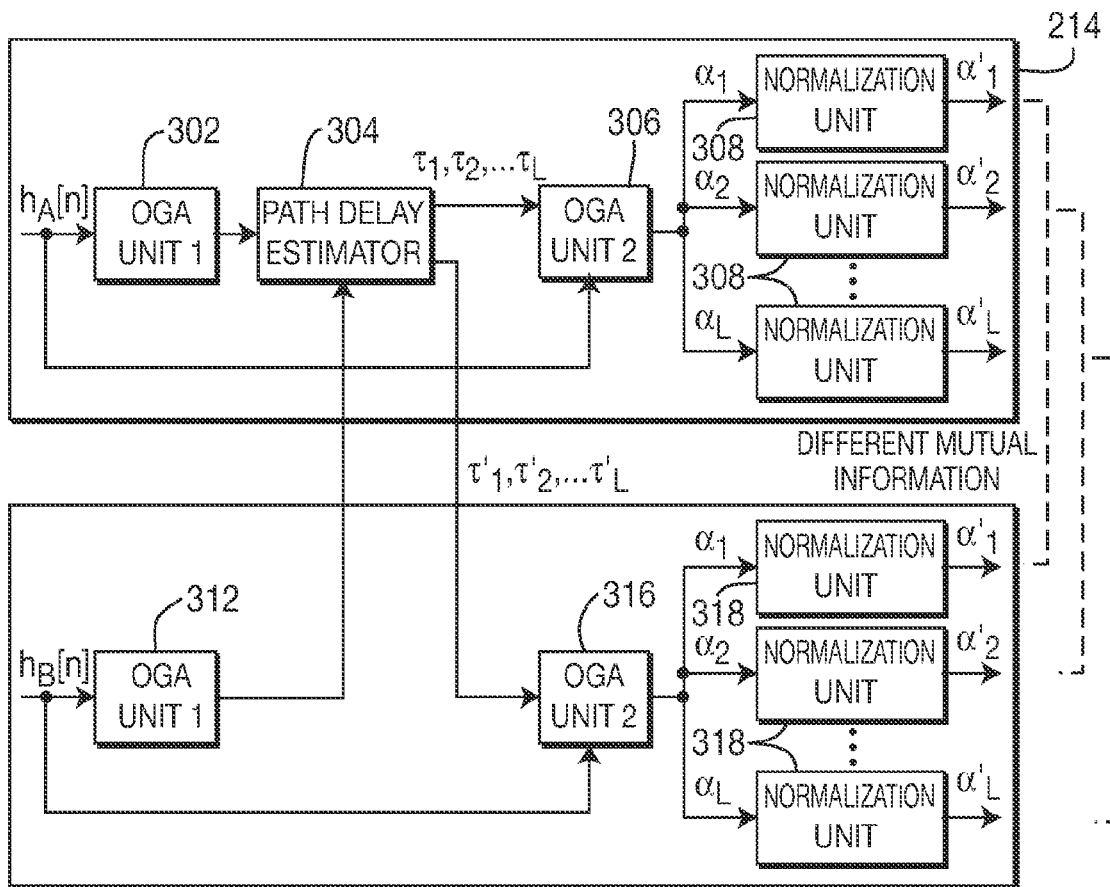
FIG. 24 is a block diagram of the post processor of the first WTRU and the post processor of the second WTRU in accordance with the present invention.

Alternatively, OGA may be applied twice, one as a part of path searcher and the other as an independent samples generator. Alternative means of finding the path locations, (e.g., a path searcher as in a CDMA system), may be employed. FIG. 24 is a block diagram of the post processor 214 of the first WTRU 210 and the post processor 234 of the second WTRU 230 in accordance with the present invention. The post processor 214 includes a first OGA unit 302, a path delay estimator 304, a second OGA unit 306 and a plurality of normalization units 308. The post processor 234 includes a first OGA unit 312, a second OGA unit 316 and a plurality of normalization units 318.

The first OGA unit 302, 312 is a part of the path searcher and the second OGA unit 306, 316 works as an independent samples generator. With a sampled CIR as the input signal, the first OGA unit 302, 312 performs the basic OGA operations. However, instead of pairs of path delay and path amplitude, the outputs of the first OGA unit 302, 312 are only path delays. The path delays detected from every channel observation are not guaranteed to be identical, although they are supposed to be around the underlying path delays.

The first OGA unit 312 of the second WTRU 230 transmits all its detected path delays to the first OGA unit 302 of the first WTRU 210 to estimate the underlying path delays of the channel. The path delay estimator 304 determines the sampling time difference between the first WTRU 210 and the second WTRU 230 (step 1), discard unpaired path delays resulting from independent OGA application at both terminals (step 2), and estimate the underlying path delays for both the first WTRU 210 and the second WTRU 230 (step 3).

In step 1, the time line is partitioned into small segments and the path delay estimator 304 counts the number of detected path delays of the first WTRU 210 and the second WTRU 230 in each segment, respectively. For example, the duration of each time segment may be set as a fraction, 0.125 of the transmitted symbol time period. The sampling time difference between the first WTRU 210 and the second WTRU 230 is determined by comparing the distribution of respective detected path delays in the unit of each time segment.

Figure 25:
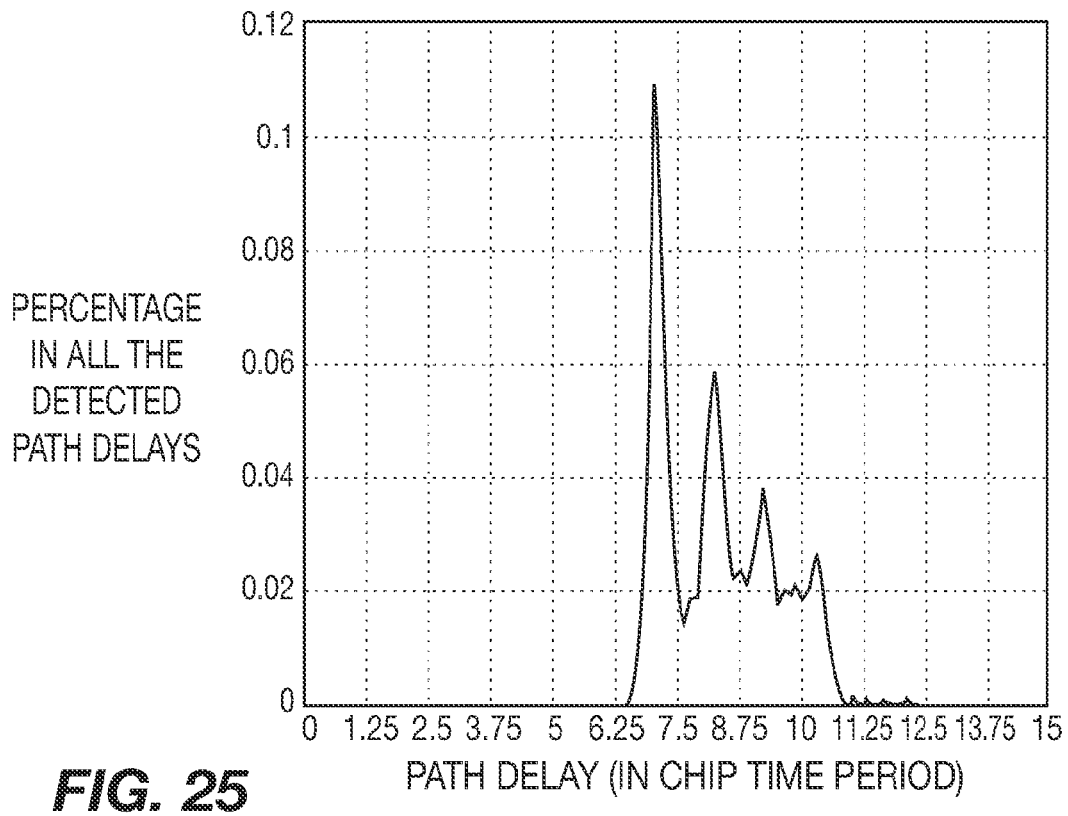
FIG. 25 shows an example on the histogram of the normalized frequency of the detected path delays for a WG4 Case 3 channel at SNR=20 dB.

For example, the sampling time difference may be set as the difference between the two time segments of the first WTRU 210 and the second WTRU 230 containing the largest number of detected path delays. Alternatively, it may be set as the difference between the two first time segments of the first WTRU 210 and the second WTRU 230 containing more than a certain number of detected path delays. Then, all of the path delays of the second WTRU 230 are adjusted according to the estimated sampling time difference. FIG. 25 shows an example on the histogram of the normalized frequency of the detected path delays for a WG4 Case 3 channel at SNR=20 dB. The plot is based on 1000 channel observations.

Figure 26:
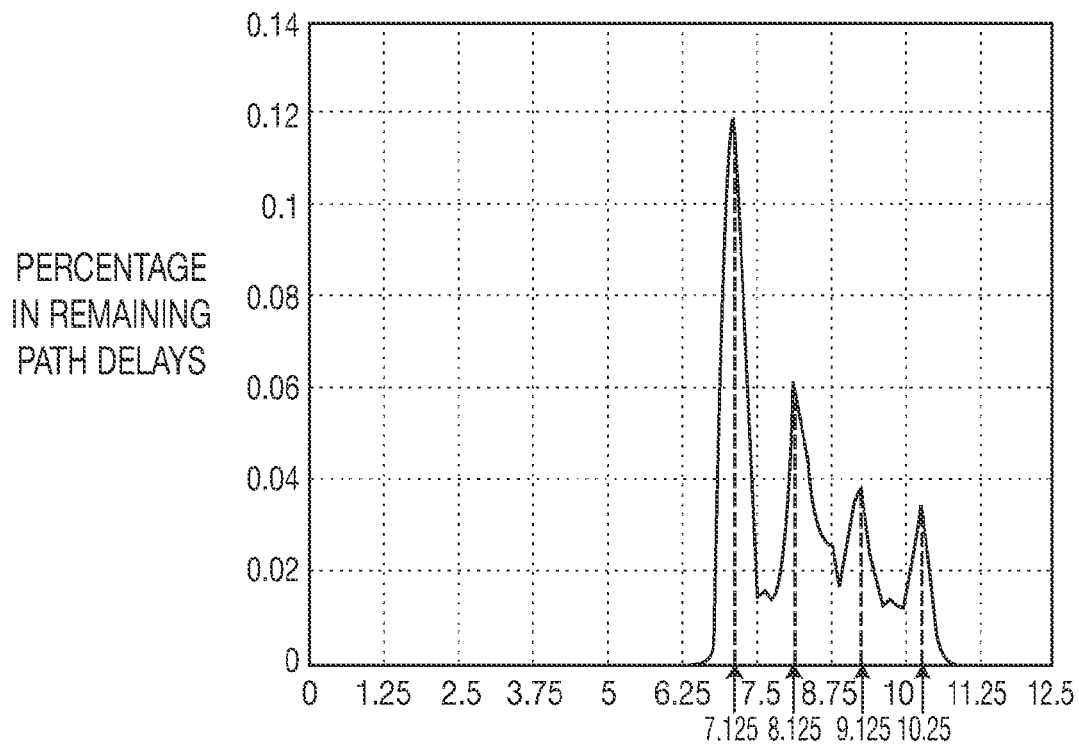
FIG. 26 shows the histogram of the normalized frequency of the remaining path delays after step 2.

In step 2, the path delay estimator 304 compares the two lists of path delays detected by the first WTRU 210 and the second WTRU 230. If for a path delay in the shorter list, there is a corresponding value within a tolerance margin of 20% of channel-transmitted symbol time period in the longer list, then this pair of path delays may be assumed to be the same path. All "unpaired" path delays are discarded. Given the path delays in step 1, with histogram shown in FIG. 25, the histogram of the normalized frequency of the remaining path delays after step 2 is shown in FIG. 26. It can be seen that the curve in FIG. 26 is smoother than that in FIG. 25.

In step 3, the path delay estimator 304 sets the underlying path delays for the first WTRU 210 as the beginning of those time segments, which contain "locally" maximum numbers of path delays and those numbers being above a certain threshold. The threshold may be chosen as 0.01 of the total number of the remaining path delays. A time segment may be said to contain a locally maximum number of path delays if its preceding and following 4 neighbor segments contain a fewer path delay count than this segment. For example, with the above threshold, the estimated path delays with distribution shown in FIG. 26 are approximately (7.125, 8.125, 9.125, 10.25) chip time period. The path delay estimator 304 sets the underlying path delays for the second WTRU 230 as the estimated path delays for the first WTRU 210 plus their sampling time difference.

Path identification in accordance with the above method may be used for path detection in a receiver, such as a Rake receiver in a CDMA system or for placing taps for an equalizer.

Simulations show that the first OGA unit and the path delay estimator (with the selected threshold) work pretty well for most 3GPP WG4 channels. Table 5 shows the number of detected paths for 3GPP WG4 channels. It is seen from Table 5 that all the underlying paths are found for 3GPP WG4 Case 1/2/3 channels and most of the underlying paths for ITU PB3 and ITU VA30 channels.

TABLE 5

| Channel model | WG4 Case 1 | WG4 Case 2 | WG4 Case 3 | ITU PA3 | ITU PB3 | ITU VA30 |
|---|---|---|---|---|---|---|
| Number of detected paths | 2 | 3 | 4 | 1 (SNR <22 dB) 2 (SNR ≧22 dB) | 5 | 4 (SNR <22 dB) 5 (SNR ≧22 dB) |
| Number of underlying paths | 2 | 3 | 4 | 4 | 6 | 6 |

The above path searcher may be implemented in alternate ways, (e.g., by utilizing the tap information gained from a rake receiver or equalizer).

The path delay estimator 304 sends the underlying path delays for the second WTRU 230 to the second WTRU 230. The second OGA unit 306, 316, with the underlying path delays and a sampled CIR as input performs the OGA operations. The second OGA unit 306, 316, for a given path delay $\tau_l$, determines its corresponding path amplitude $\alpha_l = m_l^{j\Phi_l}$ according to Equations (53) and (54) (step 1), sets $H_{l+1}(f) = H_l(f) - \alpha_l e^{-2\pi f \tau_l}$ (step 2), repeats for the entire given path delays $(\tau_1, \ldots, \tau_L)$ and outputs $(\alpha_1, \ldots, \alpha_L)$ (step 3).

The number of iterations in this case is fixed to be the number of estimated underlying paths, and hence, no stopping threshold is needed. The outputs of the second OGA unit 306, 316, (i.e., path amplitudes), are independent Gaussian random variables, which are normalized to unit variance by the normalization units 308, 318 based on their estimated variances.

The goal of exchanging path delays between the first WTRU 210 and the second WTRU 230 is to reduce the errors from independent application of OGA by means of discarding unpaired path delays. Unpaired path delays are most likely to be wrong path delays. By removing unpaired path delays, the true paths become clear. For instance, the four peaks (indicating four paths in WG4 Case 3 channel) in FIG. 26 are more obvious than in FIG. 25. In addition, by removing unpaired path delays, fewer channel observations are required to correctly estimate the underlying path delays.

Figures 27, 28:
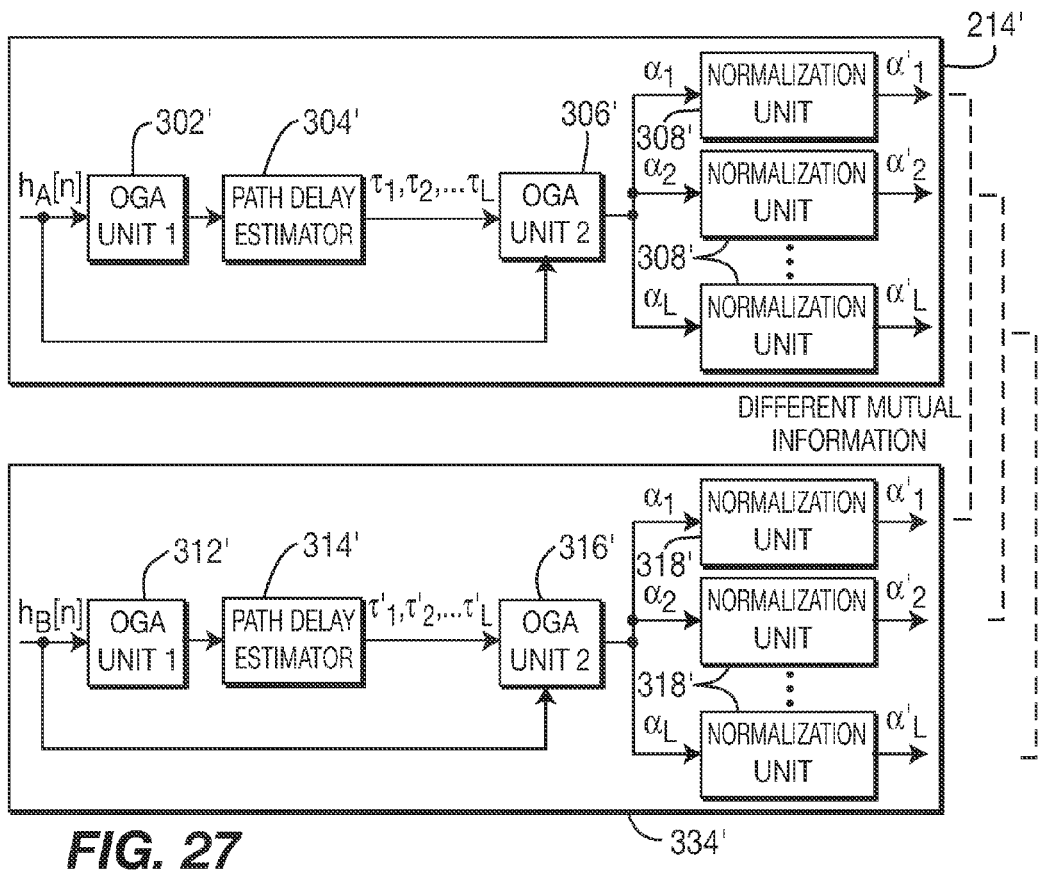
FIG. 27 is a block diagram of the post processor of the first WTRU and the post processor of the second WTRU in accordance with alternative embodiment of the present invention.
FIG. 28 shows the error rate of estimating sampling time difference for an ITU PB3 channel.

FIG. 27 is a block diagram of the post processor 214' of the first WTRU 210 and the post processor 234' of the second WTRU 230 in accordance with an alternative embodiment of the present invention. The post processor 214' includes a first OGA unit 302', a path delay estimator 304', a second OGA unit 306' and a plurality of normalization units 308'. The post processor 234' includes a first OGA unit 312', a path delay estimator 314', a second OGA unit 316' and a plurality of normalization units 318'. In this alternative, the first WTRU 210 and the second WTRU 230 separately estimate the underlying path delays without any communication with each other. The first OGA unit 302', 312' and the second OGA unit 306', 316' perform the same operations as before, while the path delay estimator 304', 314' is simplified. The first two steps performed by the path delay estimator 304 are not needed in this implementation, but only the third step is performed. The threshold may be chosen as 0.016 of the total number of detected path delays.

Table 6 shows the minimum number of channel observations needed for both implementations to estimate the given number of paths as in Table 5. The minimum number of channel observations required for the second implementation to correctly estimate path delays is greater than that for the first implementation.

TABLE 6

| Channel model | WG4 Case 1 | WG4 Case 2 | WG4 Case 3 | ITU PA3 | ITU PB3 | ITU VA30 |
|---|---|---|---|---|---|---|
| Number of detected paths (cf. Table 1) | 2 | 3 | 4 | 1 | 5 | 4 |
| Number of Channel Observations for the first implementation | 158 | 3 | 222 | 1300 | 42 | 790 |
| Number of Channel Observations for the second implementation | 219 | 26 | 273 | More than 3000 | 49 | 830 |

The above path searcher may be implemented in alternate ways, (e.g., by utilizing the tap information gained from a rake receiver or equalizer).

After the single pass or double pass OGA application, the first WTRU 210 and the second WTRU 230 get several sequences of normalized Gaussian random variables, one sequence per estimated path. These sequences may be concatenated into one sequence and a secret key may be generated as stated hereinbefore. According to this scheme, the Gaussian random variables from multiple paths are mixed before generating the secret key. Hence this scheme is called mixed processing. Specifically, by the mixed processing, all the normalized Gaussian random variables from different paths are quantized at the same level, (i.e., the same number of bits per sample), and the quantization level is determined by the SNR for the reference path.

Due to the difference in average path power of a multipath fading channel, each path corresponds to an individual SNR, which is likely to be different from the SNR for the reference path. Hence, the correlation between two terminals' corresponding Gaussian sequences from one path may be different from that for another path. Therefore, separate processing on the Gaussian sequence for each path may result in a higher secret key rate because the Gaussian random variables resulting from different paths are sampled with different quantization levels or step sizes, and thus the sampled signal level for a path depends on the actual SNR for that path, rather than the SNR for the reference path. In general, the Gaussian random variables resulting from a path corresponding to a high SNR are sampled to produce more bits per sample than a low SNR path. The SNR for each path may be estimated as it is proportional to the square of the average path amplitude.

After quantizing the Gaussian random variables to per path bit strings, the first WTRU 210 may send the syndromes of those per path bit strings (in terms of one or more given LDPC codes) to the second WTRU 230. The second WTRU 230 then decodes all of per path bit strings of the first WTRU 210. Both WTRUs 210, 230 extract a secret key from the per path bit strings of the first WTRU 210. This scheme is operating separate processes for each path, hence it is called per path processing. Note that the per path processing is different from the per bit processing described above. The per bit processing means separately processing each quantized bit from a single path.

Alternatively, after the per path quantization, the first WTRU 210 may concatenate all the resulting bit strings into one bit string, sends syndrome of the resulting single bit string to the second WTRU 230, and extracts a secret key from it. The second WTRU 230 then decodes its equivalent representation of the bit string using the received syndrome and extracts a secret key from it in the same manner. This alternative is called mixed processing.

While the implementation of the mixed processing is straightforward, the operation of separate processing as part of the per path processing scheme brings system level issues that need to be resolved. The central issue is that there are several syndrome bit streams generated for each of the paths that are found. These bits are nevertheless sent over the same air interface and the receive side is required to identify which bits belong to which path. Moreover, each process completes at different times and this introduces a potential to lose synchronization between the two WTRUs 210, 230.

Identifying which syndrome belongs to which path may be performed by labeling the packets which carry these bits. A packet includes a packet header with information used to identify which path the packet is related to. If both WTRUs 210, 230 detect the same number of paths, which is guaranteed by the first implementation of the double pass scheme, then including the path index in the packet header is enough to identify paths.

When there is no guarantee that the WTRUs 210, 230 identified the same exact number of paths, the paths may be identified using relative path delays relative to the earliest path, relative to the largest amplitude path, or relative to all or a subset of identified paths. This approach avoids an overhead altogether. This approach also does not reveal the locations of the paths. Such location information contains some secrecy, although the secrecy rate is significantly lower (almost negligible) in comparison to the rate obtained from path amplitudes. Nevertheless, in certain applications, it may be worthwhile to preserve it. An alternative method of encoding may use a fixed maximum data structure for each path and thus the encoding is implicit in the position where the information is held. This introduces redundancy in data transmission, but does not reveal any information.

Besides OGA, an alternative way of removing correlation among samples of random variables is using differential coding of the CIR samples.

Besides OGA, one of the methods to remove correlation among samples of random variables is compression. Compressing correlated samples helps to reduce the redundancy within those samples. However, compression is infeasible to the secret key generation. Conventional compression algorithms usually extract messages from given samples, and describe them in a compact form. Hence, the compact description depends on messages, and the compact descriptions of two similar but not identical messages are likely to be in different forms.

In secret key generation, the compact description of the first WTRU's observations is possibly in a fully different form from that for the second WTRU's observations due to the little difference in these observations. For example, consider two similar bit strings of the same length and with BER=0.1. Assume these two bit strings are derived from respective observations of the same channel. Hence, there is lots of redundancy in these strings. If these two strings are compressed by conventional compression algorithms like Burrows and Wheeler (BWT), the BER of the two compressed strings will be as large as 0.5. Furthermore, the two compressed strings are most likely of different lengths. Hence, compressing respective channel observations poses challenges for the subsequent secret key generation.

A second chance of removing correlation by compression is after two WTRUs 210, 230 agree on the same redundant string. However, the process in which both WTRUs 210, 230 agree on this redundant string may involve too many "correction bits" being revealed. This will dramatically reduce the achieved secret key rate. It is even possible that no secret key would be generated.

A delay in the time domain is equivalent to a phase shift in the frequency domain. Mathematically, the Fourier transform of $h(t-\tau)$ is $H(f)e^{-j2\pi f\tau}$. Instead of estimating the sampling time difference in the time domain, each WTRU 210, 230 estimates the phase shift of its observed signal in the frequency domain. The phase shift of a signal can be approximated by linear regression. Linear regression is the process of fitting the best possible straight line through a series of points. It is often used to reduce a set of calibration points to a simple mathematical relationship.

The error rate of estimating the sampling time difference by a linear regression approach is examined by simulation. An error is declared if the estimated sampling time difference is beyond 20% of channel-transmitted symbol time period from the underlying sampling time difference. FIG. 28 shows the estimation error rate for an ITU PB3 channel. The error rate is high as the estimation is made for each channel observation. Simulations show that the overall estimation error rate is significantly reduced, (e.g., below 0.01 at SNR=15 dB), when averaging the difference time offsets from multiple channel observations. In the simulation, the sampling rate is twice the Nyquist rate and the underlying sampling time difference is set as 20% of chip time period.

FIGS. 29-37 show simulation results on the secret key rate resulting from different OGA application schemes, (i.e., single pass or double pass), and different post-processing schemes, (i.e., mixed processing or per path processing), for most WG4 channels. In the simulations, the first WTRU uses equiprobable quantization and Gray coding to encode the Gaussian samples to a bit string. The syndrome of this bit string (in terms of a given LDPC code) is transmitted to the second WTRU. The second WTRU then tries to decode that bit string, in which the log-likelihood ratio is softly decided. Finally, both WTRUs hash out the publicly revealed information, (i.e., the syndrome), from that bit string, leaving purely secret bits. In the simulations, an irregular LDPC code is used with rate=½, block size=4800 bits, and degree distribution pair as:

$$\lambda(x)=0.071428x+0.230118x^2+0.079596x^9+0.147043x^{10}+0.073821x^{48}+0.397994x^{49},$$

$$\rho(x)=x^{27}.$$

Thirty iterations of the belief-propagation algorithm are allowed. The target secret key BER of $10^{-4}$ is achieved in all the simulations.

Figure 29:
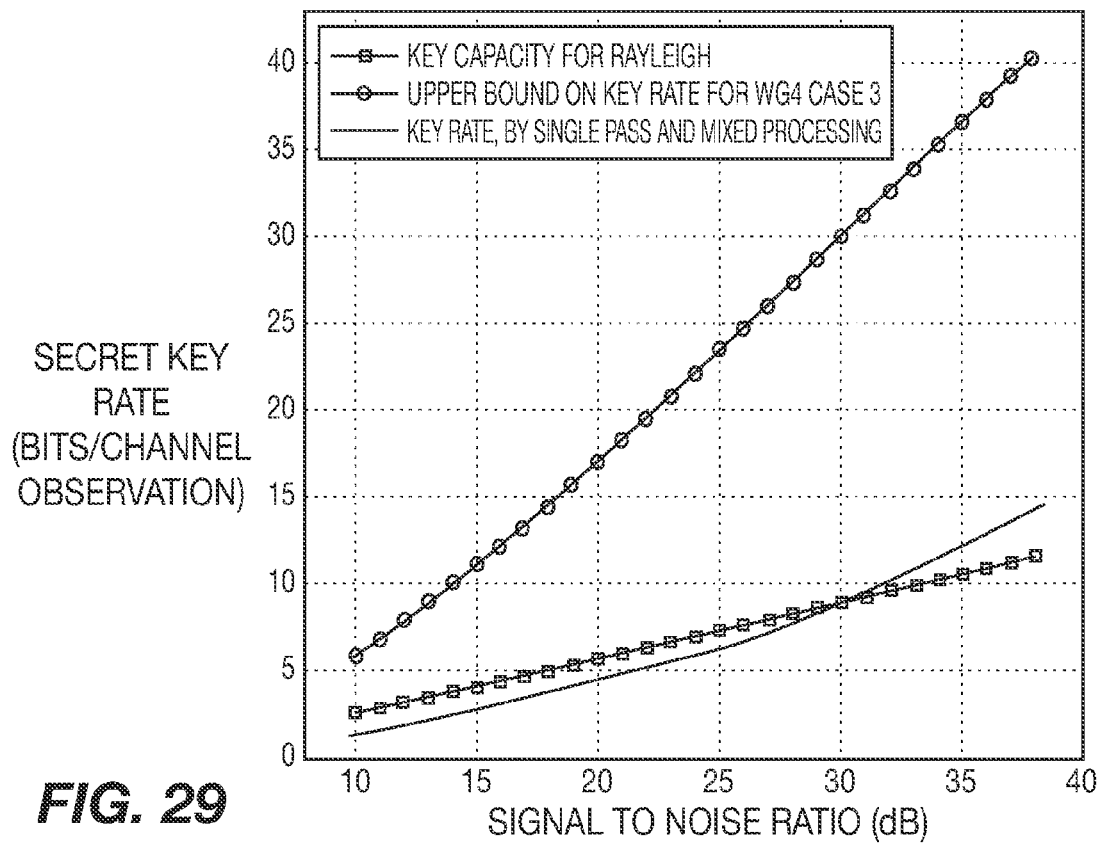
FIG. 29 shows the secret key rate for a WG4 Case 3 channel achieved by using single pass and mixed processing schemes.

The secret key rate for a WG4 Case 3 channel achieved by using single pass and mixed processing schemes is shown in FIG. 29. The achieved secret key rate is much lower than the upper bound. It is even lower than the secret key capacity for a single-path Rayleigh channel at SNR<30 dB. The low secret key rate is partly due to the missing paths, and partly due to the errors from independent OGA application at both terminals.

Figure 30:
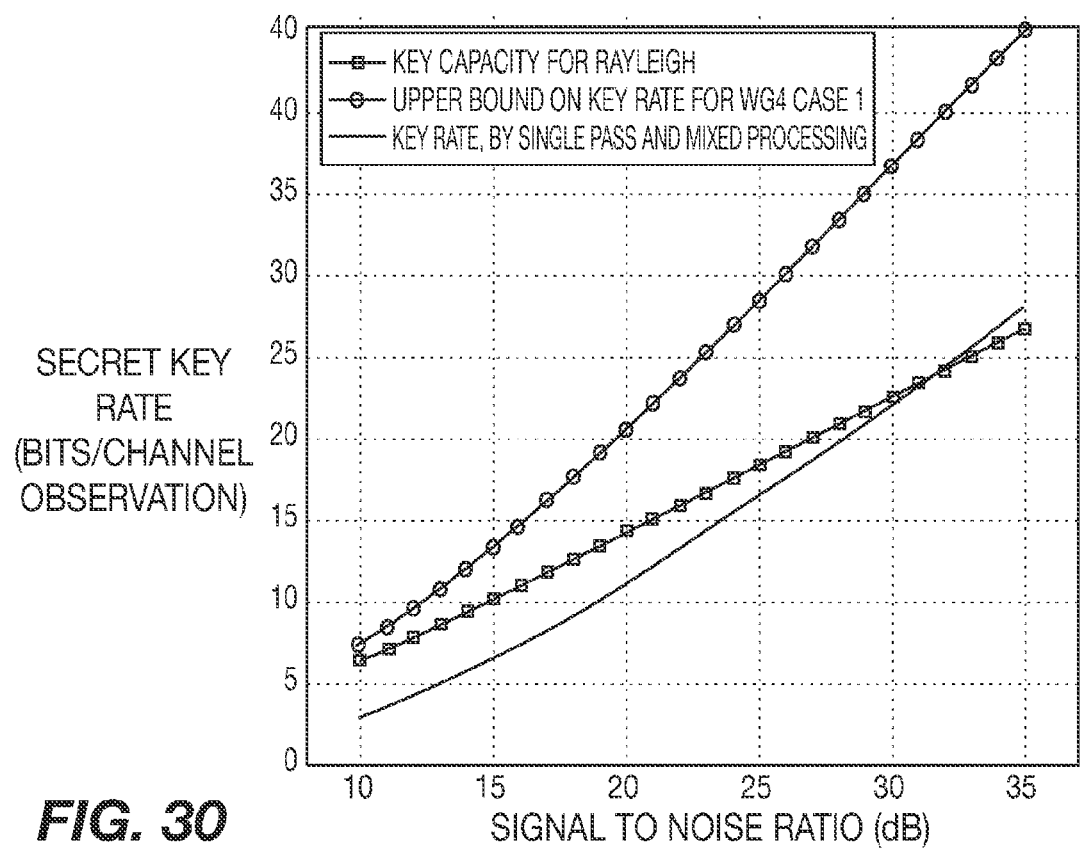
FIG. 30 shows the secret key rate for a WG4 Case 1 channel achieved by using single pass and mixed processing schemes.

FIG. 30 shows the secret key rate for a WG4 Case 1 channel achieved by using single pass and mixed processing schemes. The achieved secret key rate is low for the same reasons.

Figure 31:
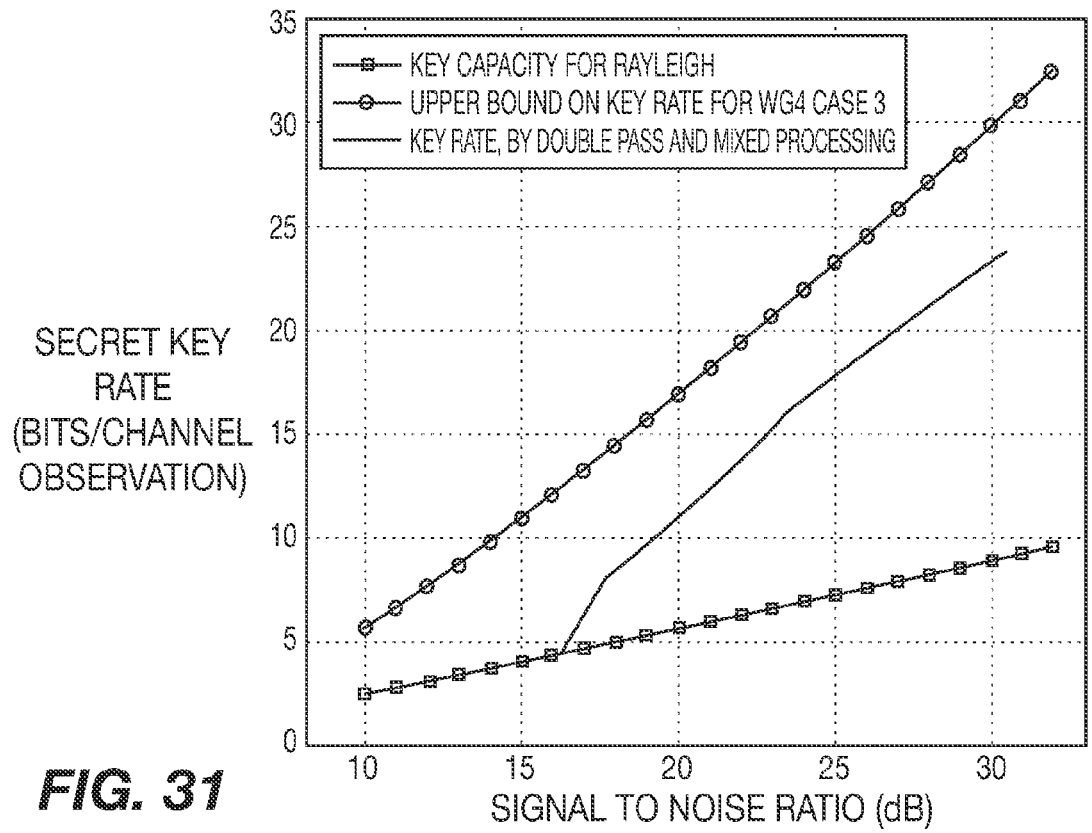
FIG. 31 shows the secret key rate for a WG4 Case 3 channel achieved by using double pass and mixed processing schemes.

FIG. 31 shows the secret key rate for a WG4 Case 3 channel achieved by using double pass and mixed processing schemes. The secret key rate is significantly increased compared to FIG. 29. This is because all four underlying paths of a WG4 Case 3 channel are detected by using the double pass scheme.

Figure 32:
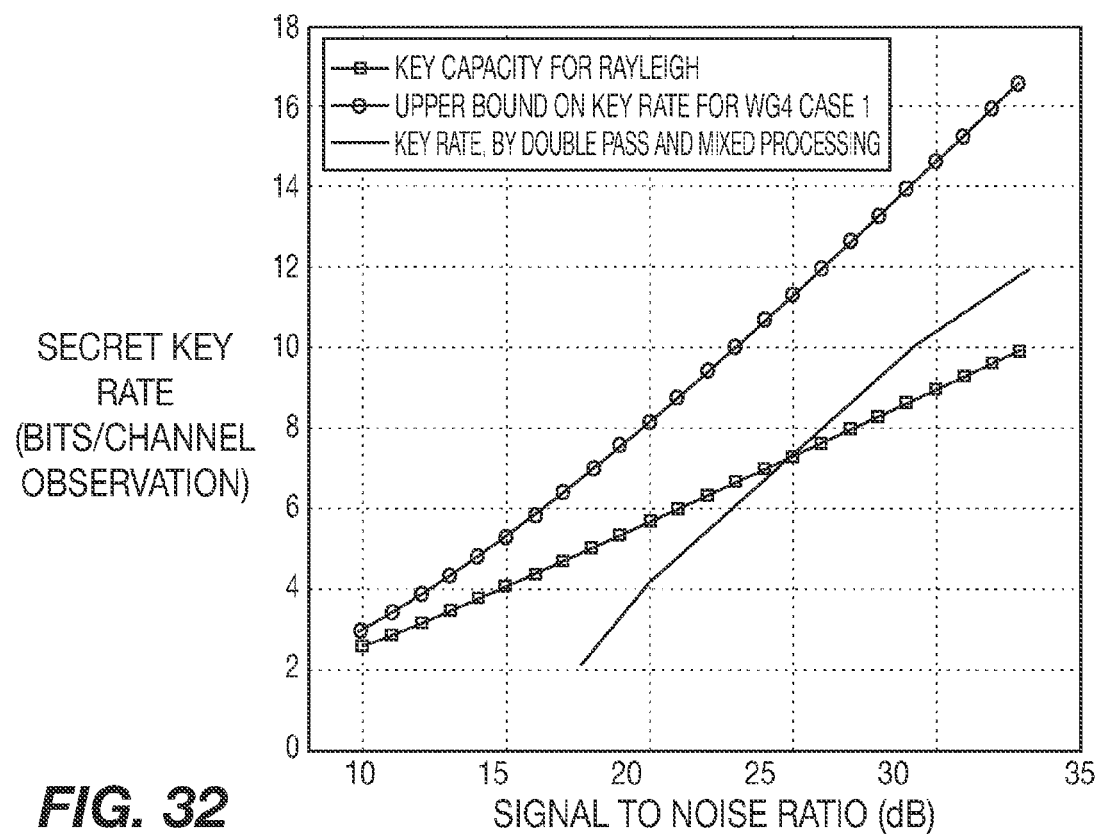
FIG. 32 shows the secret key rate for a WG4 Case 1 channel achieved by using double pass and mixed processing schemes.

The secret key rate for a WG4 Case 1 channel achieved by using double pass and mixed processing schemes is shown in FIG. 32. Unlike a WG4 Case 3 channel, the resulting secret key rate for a WG4 Case 1 channel is still low. A WG4 Case 1 channel is composed of two paths with a large difference in their relative average power (the difference is 10 dB). When Gaussian random variables from both paths are quantized at the same level, the two resulting bit strings have different correlations with those on the other terminal. Specifically, the BER of the two corresponding strings derived from the second path is much higher than that derived from the first path. The mixture of the strings derived from both paths leads to a relatively high BER of the resulting strings at the two terminals, which prevents them from generating a common secret key. Thus, the mixed processing scheme results in low secret key rate for those multipath channels with a large difference in average path powers. This issue may be addressed by the per path processing scheme.

Figure 33:
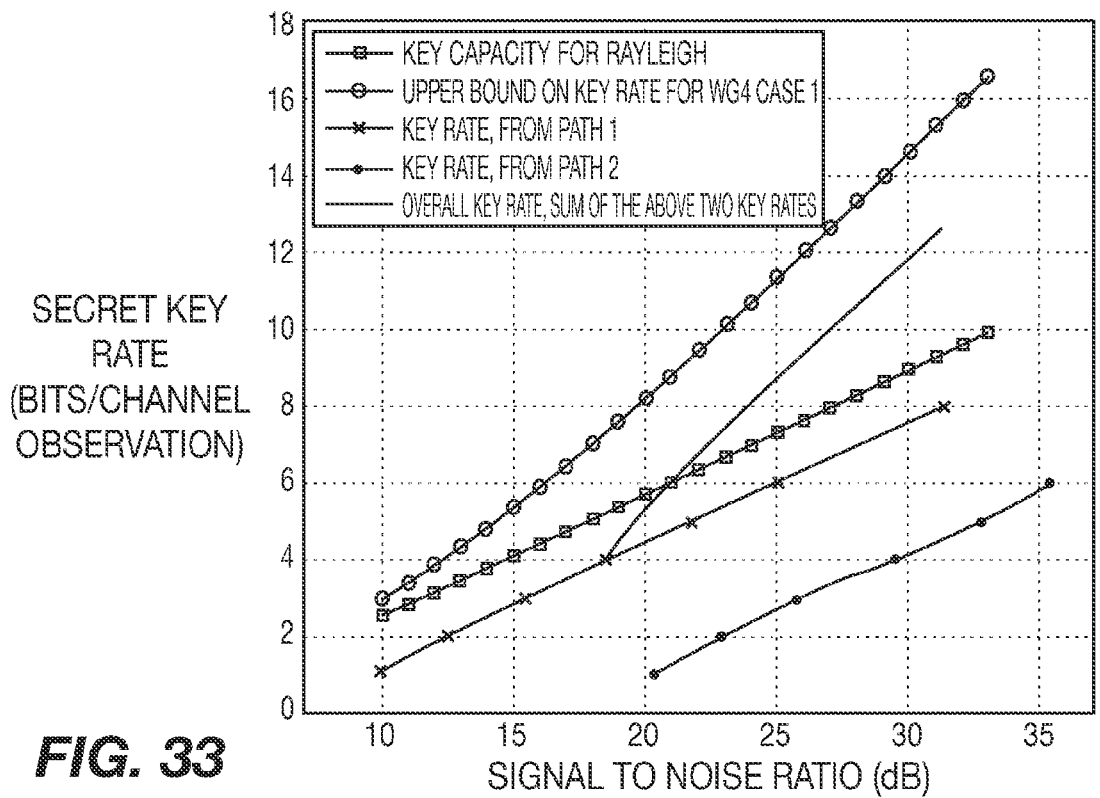
FIG. 33 shows the achieved secret key rate for a WG4 Case 1 channel when double pass and per path processing schemes are used.
Figure 34:
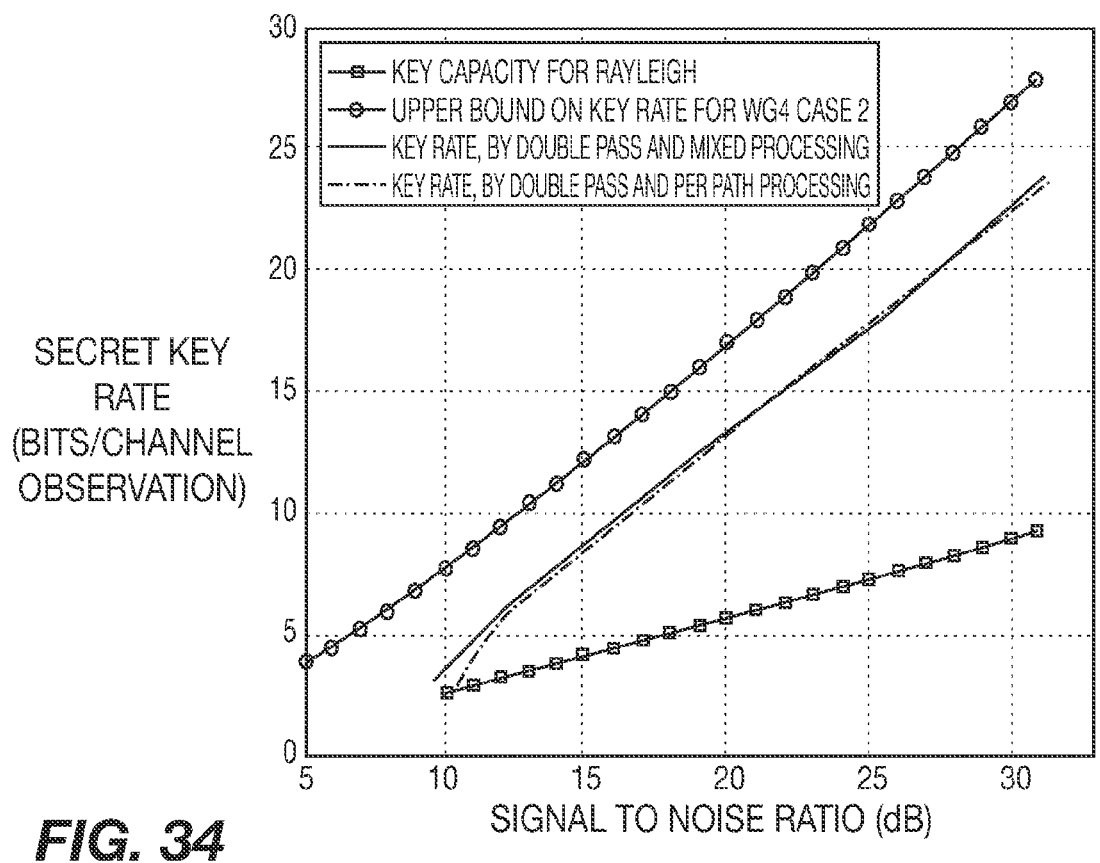
FIGS. 34-37 show the respective secret key rates for WG4 Case 2, ITU PA3, ITU PB3 and ITU VA30 channels, achieved by using double pass plus mixed processing schemes and double pass plus per path processing schemes.

FIG. 33 shows the achieved secret key rate when double pass and per path processing schemes are used. The overall achieved secret key rate, as the sum of two secret key rates from two paths, is within 2.5 bits of the upper bound.

FIGS. 34-37 show the respective secret key rates for WG4 Case 2, ITU PA3, ITU PB3 and ITU VA30 channels, achieved by using double pass plus mixed processing schemes and double pass plus per path processing schemes. Except for WG4 Case 2 channel, the secret key rate resulting from the per path processing scheme is always higher than that resulting from the mixed processing scheme. This is due to the more or less difference in average path powers of these channels. For a WG4 Case 2 channel, the mixed processing scheme and the per path scheme make no difference on the achieved secret key rate, since all 3 underlying paths of a WG4 Case 2 channel are of the same average power.

Figure 35:
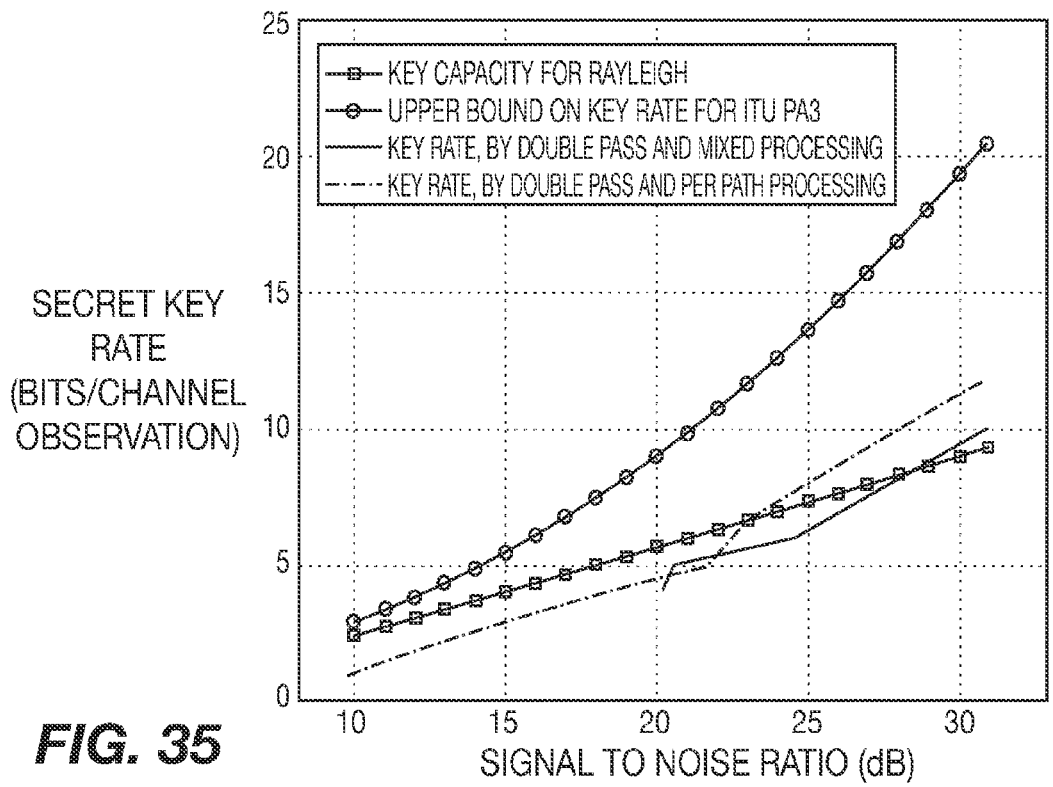
Figure 36:
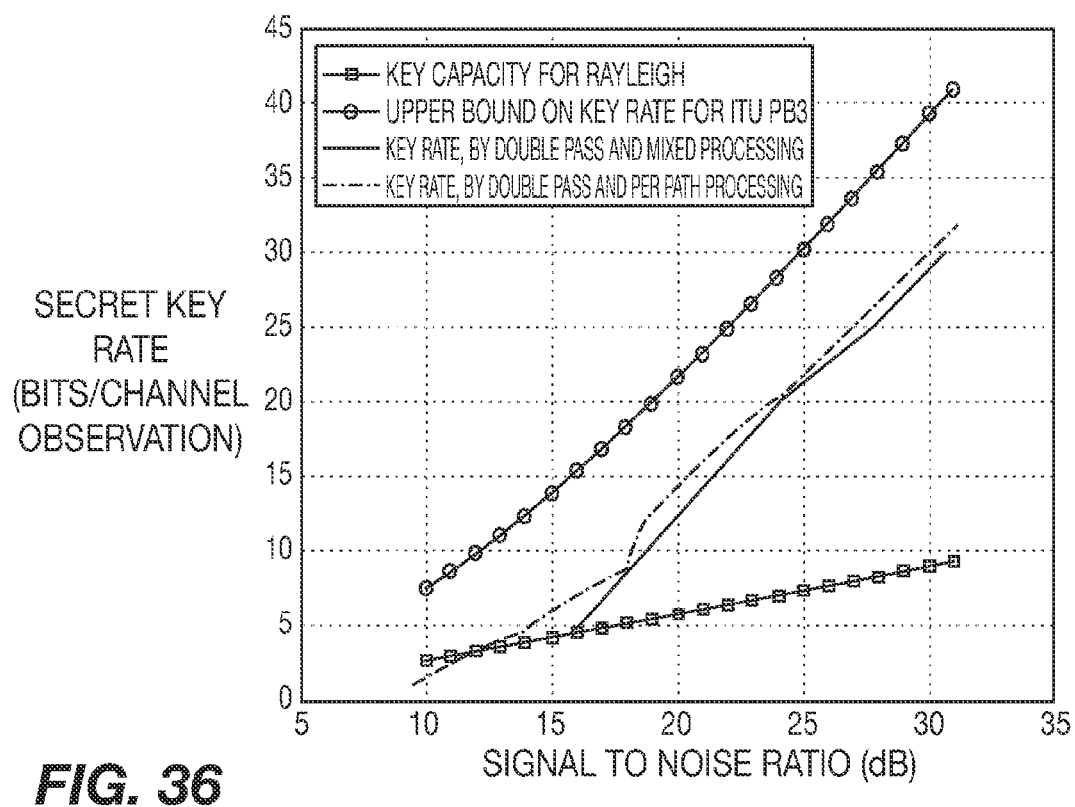
Figure 37:
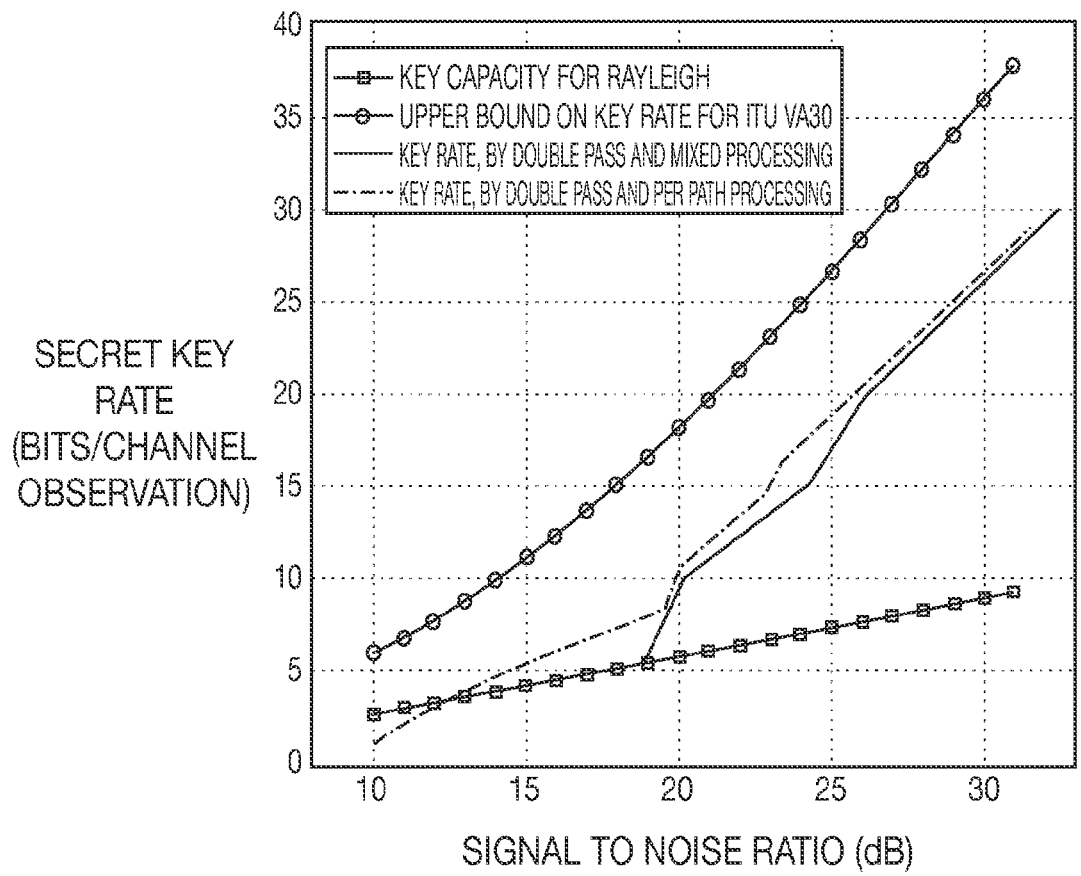

The large gap between the achieved secret key rate and the upper bound on secret key rate for an ITU PA3 channel is shown in FIG. 35. An obvious explanation is that only 2 paths out of 4 underlying paths are detected by the path searcher (Table 1). The achieved secret key rate is based on the 2 detected paths, while the upper bound is derived from all 4 underlying paths.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for use in a WTRU, user equipment, terminal, base station, radio network controller, or any host computer. The WTRU may be used in conjunction with modules, implemented in hardware and/or software, such as a camera, a videocamera module, a videophone, a speakerphone, a vibration device, a speaker, a microphone, a television transceiver, a handsfree headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for generating a secret key from joint randomness shared by a first wireless transmit/receive unit (WTRU) and a second WTRU, the method comprising:
    the second WTRU generating a second sampled channel impulse response (CIR) based on a channel between the first WTRU and the second WTRU;
    the second WTRU receiving a syndrome from the first WTRU, wherein the syndrome has been generated by the first WTRU from a first set of bits generated from a first sampled CIR based on the channel between the first WTRU and the second WTRU;
    the second WTRU generating the second set of bits from the syndrome received from the first WTRU and the second sampled CIR; and
    the second WTRU generating the secret key from the second set of bits.

2. The method of claim 1 further comprising:
    the second WTRU receiving over-quantized bits from the first WTRU, wherein the second WTRU generates the second set of bits further based on the over-quantized bits.

3. The method of claim 1 further comprising:
    the second WTRU identifying at least one multipath component in the second sampled CIR; and
    the second WTRU generating the secret key from each of the identified multipath components.

4. A wireless transmit/receive unit (WTRU) for generating a secret key from joint randomness shared with a communication peer, the WTRU comprising:
    a channel estimator configured to generate a second sampled CIR based on a channel between the WTRU and the communication peer;
    a receiver configured to receive a syndrome from the communication peer, the syndrome having been generated by the communication peer from a first sampled CIR based on the channel between the WTRU and the communication peer;
    a decoder configured to generate a second set of bits from the second sampled CIR and the syndrome received from the communication peer; and
    a processor configured to generate the secret key from the second set of bits.

5. The WTRU of claim 4 wherein the receiver is further configured to receive over-quantized bits from the communication peer and generates the second set of bits further based on the over-quantized bits.

6. The WTRU of claim 4 wherein the processor is further configured to identify at least one multipath component in the second sampled CIR and generates the secret key from each of the identified multipath components.

7. A method for generating a secret key from joint randomness shared by a first wireless transmit/receive unit (WTRU) and a second WTRU, the method comprising:
    the first WTRU performing channel estimation to generate a first sampled channel impulse response (CIR) on a channel between the first WTRU and the second WTRU;
    the first WTRU generating a first set of bits from the first sampled CIR;
    the first WTRU generating the secret key;
    the first WTRU generating a syndrome from the first sampled CIR based on the channel between the first WTRU and the second WTRU; and
    the first WTRU sending the syndrome to the second WTRU to enable the second WTRU to generate the secret key from the syndrome and a second set of bits generated by the second WTRU from a second sampled CIR based on the channel between the first WTRU and the second WTRU.

8. The method of claim 7 further comprising:
    the first WTRU performing quantization of the first sampled CIR to generate quantized bits; and
    the first WTRU performing source coding on the quantized bits to generate the first set of bits.

9. The method of claim 8 wherein the performing source coding includes selecting a source coding rate to minimize the length of the syndrome and enable a correct decoding at the second WTRU.

10. The method of claim 8 wherein the performing quantization includes:
  performing over-quantization to generate regularly quantized bits and over-quantized bits;
  generating the syndrome and the secret key from the regularly quantized bits; and
  the sending the syndrome includes sending the over-quantized bits.

11. The method of claim 10 wherein the sending the syndrome includes sending a quantization error of the first sampled CIR.

12. The method of claim 11 further comprising:
  the first WTRU transforming the quantization error by mapping the quantization error to a uniform random variable, whereby the transformed quantization error is independent of a quantization partition and is uniformly distributed.

13. The method of claim 7 wherein the generating the syndrome includes performing binary low density parity check (LDPC) coding, Reed-Solomon coding, Turbo coding, or differential coding.

14. The method of claim 7 wherein the generating the syndrome includes generating a plurality of per bit syndromes by processing each bit in the first set of bits separately.

15. The method of claim 7 further comprising:
  the first WTRU puncturing the syndrome;
  the first WTRU transmitting a punctured version of the syndrome; and
  the first WTRU informing the second WTRU of puncturing positions on the syndrome to enable the second WTRU to generate the second set of bits based on the punctured version of the syndrome.

16. The method of claim 7 wherein the performing channel estimation includes generating a sampled CIR for each of a plurality of antenna combinations.

17. The method of claim 7 further comprising:
  the first WTRU identifying a multipath component in the first sampled CIR; and
  the first WTRU generating the secret key from the identified multipath component.

18. The method of claim 17 wherein the identifying a multipath component includes using an orthogonal greedy algorithm (OGA).

19. The method of claim 17 wherein the identifying a multipath component includes:
  identifying a dominant multipath component;
  on a condition that a threshold test passes, outputting the identified dominant multipath component; and
  on a condition that the threshold test fails, subtracting the identified dominant multipath component from the first sampled CIR and repeating the identifying a multipath component.

20. The method of claim 19 wherein the threshold test includes comparing an $l^2$ norm of a residual component with a threshold.

21. The method of claim 19 wherein the threshold test includes comparing an absolute value of the identified multipath component with a threshold.

22. The method of claim 19 wherein the threshold test is set to a portion of a first identified multipath component.

23. The method of claim 17 wherein the identifying the multipath component includes performing time domain processing by correlating the first sampled CIR with a sampled pulse shape to find a multipath component with a maximum correlation.

24. The method of claim 17 wherein the identifying the multipath component includes performing frequency domain processing.

25. The method of claim 17 wherein the identifying the multipath component includes storing a sampled pulse shape in a dictionary for a discrete time interval, whereby the multipath component is identified by using the dictionary.

26. The method of claim 17 further comprising:
  the first WTRU receiving all detected path delays in the second sampled CIR from the second WTRU;
  the first WTRU determining sampling time difference between the first WTRU and the second WTRU;
  the first WTRU discarding unpaired path delays;
  the first WTRU estimating underlying path delays for the first WTRU and the second WTRU;
  the first WTRU sending the underlying path delays to the second WTRU;
  the first WTRU generating path amplitude values from the first sampled CIR based on the underlying path delays; and
  the first WTRU normalizing the path amplitude values.

27. The method of claim 26, further comprising:
  partitioning a time line into time segments;
  the first WTRU counting detected path delays of the first WTRU and the second WTRU in each segment; and
  the determining the sampling time difference between the first WTRU and the second WTRU includes comparing a distribution of respective detected path delays in the unit of each time segment.

28. The method of claim 27 wherein duration of each time segment is set as a fraction of a channel-transmitted symbol time period.

29. The method of claim 27 wherein the sampling time difference is set as a difference between two time segments of the first WTRU and the second WTRU containing the largest number of detected path delays.

30. The method of claim 27 wherein the sampling time difference is set as a difference between the first time segments of the first WTRU and the first time segments of the second WTRU containing more than a certain number of detected path delays.

31. The method of claim 27 wherein a path delay having corresponding value within an error tolerance margin, which is a fraction of a channel-transmitted symbol time period, is considered to be the same path.

32. The method of claim 31 wherein the underlying path delays for the first WTRU are set as the beginning of the respective time segments, which contain locally maximum numbers of path delays and those numbers being above a predetermined threshold.

33. The method of claim 32 wherein the threshold is a fraction of the total number of the remaining path delays.

34. The method of claim 32 wherein a time segment is considered to contain a locally maximum number of path delays if its preceding and following a predetermined number of neighbor segments contain a fewer path delay count than this segment.

35. The method of claim 32 wherein the underlying path delays for the second WTRU are set as the underlying path delays for the first WTRU plus the sampling time difference.

36. The method of claim 17 further comprising:
  the first WTRU identifying path delays in the first sampled CIR;
  the first WTRU estimating its underlying path delays;
  the first WTRU generating path amplitude values from the first sampled CIR based on the underlying path delays; and
  the first WTRU normalizing the path amplitude values.

37. The method of claim 36, further comprising:
the first WTRU counting detected path delays in each segment; and
the estimating the underlying path delays includes setting the underlying path delays as the beginning of a time segment that contain a locally maximum numbers of path delays that are above a predetermined threshold.

38. The method of claim 37 wherein the threshold is a fraction of the total number of the remaining path delays.

39. The method of claim 38 further comprising:
the first WTRU concatenating the normalized amplitude values to one concatenated bit string, whereby the secret key is generated from the concatenated bit string.

40. The method of claim 39 wherein a quantization level is determined by a signal-to-noise ratio (SNR) of a reference path.

41. The method of claim 39 further comprising:
the first WTRU separately processing the normalized amplitude values with different quantization levels based on a signal-to-noise ratio (SNR) of each path to generate a plurality of bit strings;
the first WTRU generating separate syndromes for each bit string; and
the first WTRU sending the separate syndromes to the second WTRU to enable the second WTRU to generate the secret key by using the separate syndromes.

42. The method of claim 41 wherein the first WTRU attaches a packet header to identify which syndrome belongs to which path.

43. The method of claim 42 wherein a path index is included in the packet header to identify which syndrome belongs to which path.

44. The method of claim 43 wherein the paths are identified using relative path delays relative to one of the earliest path, the largest amplitude path, and all or a subset of identified paths.

45. The method of claim 38 further comprising:
the first WTRU separately processing the normalized amplitude values with different quantization levels based on a signal-to-noise ratio (SNR) of each path to generate a plurality of bit strings;
the first WTRU concatenating the bit strings;
the first WTRU generating a syndrome for the concatenated bit string; and
the first WTRU sending the syndrome to the second WTRU to enable the second WTRU to generate the secret key by using the syndrome.

46. The method of claim 7 wherein the first WTRU estimates a phase shift of observed signals in the frequency domain, whereby the sampling time difference is adjusted based on the phase shift estimate.

* * * * *